US012536964B2

(12) United States Patent
Pyun et al.

(10) Patent No.: US 12,536,964 B2
(45) Date of Patent: Jan. 27, 2026

(54) DISPLAY DEVICE

(71) Applicant: SAMSUNG DISPLAY CO., LTD., Yongin-si (KR)

(72) Inventors: Kihyun Pyun, Yongin-si (KR); Seung-Woon Shin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/921,796

(22) Filed: Oct. 21, 2024

(65) Prior Publication Data

US 2025/0239228 A1 Jul. 24, 2025

(30) Foreign Application Priority Data

Jan. 22, 2024 (KR) ........................ 10-2024-0009323

(51) Int. Cl.

*G09G 3/3266* (2016.01)
*G09G 3/3233* (2016.01)

(52) U.S. Cl.

CPC ......... *G09G 3/3266* (2013.01); *G09G 3/3233* (2013.01); *G09G 2300/0819* (2013.01); *G09G 2300/0852* (2013.01); *G09G 2310/0286* (2013.01); *G09G 2310/08* (2013.01); *G09G 2320/0233* (2013.01); *G09G 2330/021* (2013.01)

(58) Field of Classification Search

CPC ......... G09G 3/3266; G09G 2300/0819; G09G 2300/0852; G09G 2310/0286; G09G 2310/08; G09G 2320/0233; G09G 2330/021

See application file for complete search history.

(56) References Cited

U.S. PATENT DOCUMENTS

| | | | | |
|---|---|---|---|---|
| 11,605,353 | B2 | 3/2023 | Sang et al. | |
| 11,626,070 | B2 | 4/2023 | Yun et al. | |
| 11,817,055 | B2 | 11/2023 | Sang et al. | |
| 11,823,619 | B2 | 11/2023 | Chung et al. | |
| 2022/0028323 | A1* | 1/2022 | In | G09G 3/2092 |
| 2022/0375412 | A1* | 11/2022 | Kim | G11C 19/28 |

FOREIGN PATENT DOCUMENTS

| | | | | |
|---|---|---|---|---|
| CN | 109243371 A * | 1/2019 | G09G 3/3266 |
| KR | 10-2018-0078928 A | 7/2018 | |
| KR | 10-2022-0022335 A | 2/2022 | |
| KR | 10-2022-0022406 A | 2/2022 | |
| KR | 10-2022-0041509 A | 4/2022 | |
| KR | 10-2022-0088602 A | 6/2022 | |

* cited by examiner

*Primary Examiner* — Stacy Khoo
(74) *Attorney, Agent, or Firm* — F. CHAU & ASSOCIATES, LLC

(57) ABSTRACT

A display device includes a display panel. The display panel includes a plurality of pixels receiving a first scan signal and a second scan signal, and a scan driver. The scan driver includes a first stage and a second stage arranged sequentially. A first pulse width of the second scan signal output from the first stage is different from a second pulse width of the second scan signal output from the second stage, when the second scan signal output from each of the first stage and the second stage is activated simultaneously.

19 Claims, 14 Drawing Sheets

DISPLAY DEVICE

CROSS-REFERENCE TO RELATED APPLICATIONS

This application claims priority under 35 U.S.C. § 119 to Korean Patent Application No. 10-2024-0009323 filed on Jan. 22, 2024, in the Korean Intellectual Property Office, the disclosure of which is incorporated by reference herein in its entirety.

TECHNICAL FIELD

Embodiments of the present disclosure relate to a display device having improved display quality.

DISCUSSION OF RELATED ART

Various display devices used in an electronic device such as, for example, a television, a mobile phone, a tablet computer, a navigation system, or a game console are being developed. As portable electronic devices operate on batteries, various efforts are continuing to reduce power consumption of display devices used in portable electronic devices.

Lowering the operating frequency of the display device may reduce power consumption. For example, in specific operating environments, such as displaying still images, lowering the operating frequency of a display device may reduce the power consumption of the display device.

SUMMARY

Embodiments of the present disclosure provide a display device having improved display quality.

According to an embodiment, a display device includes a display panel in which an active area and a peripheral area disposed adjacent to the active area are defined. The display panel includes a plurality of pixels disposed in the active area and receiving a first scan signal and a second scan signal, and a scan driver disposed in the peripheral area and connected to the plurality of pixels. The scan driver includes a plurality of stages arranged sequentially. The plurality of stages include a first stage and a second stage. A first pulse width of the second scan signal output from the first stage is different from a second pulse width of the second scan signal output from the second stage, when the second scan signal output from each of the first stage and the second stage is activated simultaneously.

In an embodiment, the second pulse width is narrower than the first pulse width when the second stage is disposed after the first stage.

In an embodiment, each of the first stage and the second stage includes a first scan output circuit including a first output node that outputs the first scan signal, a second scan output circuit including a second output node that outputs the second scan signal, a controller including a plurality of control transistors electrically connected to a control node, and a compensation circuit connected to the second scan output unit.

In an embodiment, the compensation circuit includes an inverter circuit connected to the first output node and a multiplexer circuit connected to the first output node and the inverter circuit.

In an embodiment, the multiplexer circuit receives a first clock signal having the second pulse width.

In an embodiment, the second stage generates and outputs the second scan signal based on the first clock signal.

In an embodiment, the compensation circuit further includes a control circuit connected to the control node and configured to control a voltage level of the control node.

In an embodiment, the control node is in an active state when the second scan signal is output.

In an embodiment, the first stage generates and outputs the second scan signal based on the first scan signal.

In an embodiment, when the second scan signal output simultaneously from each of the first stage and the second stage is activated, in the first stage, the first scan signal has an active level, a signal output from the inverter circuit has an inactive level, and a signal output from the multiplexer circuit has an active level.

In an embodiment, when the second scan signal output simultaneously from each of the first stage and the second stage is activated, in the second stage, the first scan signal has an inactive level, a signal output from the inverter circuit has an active level, and a signal output from the multiplexer circuit has an active level of the second pulse width.

In an embodiment, the display panel operates during a plurality of frames. Each of the plurality of frames operates in a first mode or a second mode different from the first mode. Each of the plurality of stages outputs the activated first scan signal and the activated second scan signal, when operating only in the first mode. Each of the plurality of stages outputs the activated second scan signal, when operating only in the second mode. Each of the first stage and the second stage outputs the second scan signal activated at the same time, when simultaneously operating in the first mode and the second mode.

According to an embodiment, a display device includes a display panel in which an active area and a peripheral area disposed adjacent to the active area are defined. The display panel includes a plurality of pixels disposed in the active area and receiving a first scan signal and a second scan signal, and a scan driver disposed in the peripheral area and connected to the plurality of pixels. The scan driver includes a plurality of stages arranged sequentially. Each of the plurality of stages includes a first scan output circuit electrically connected to a control node and including a first output node that outputs the first scan signal, a second scan output circuit electrically connected to the control node and including a second output node that outputs the second scan signal, and a compensation circuit connected to the second scan output unit. The compensation circuit receives the first scan signal, a first clock signal having a first pulse width, and a second clock signal having a second pulse width different from the first pulse width. The compensation circuit outputs a signal corresponding to the first clock signal or the second clock signal depending on the first scan signal. The second scan output circuit outputs the second scan signal based on the signal.

In an embodiment, when the second scan signal output from each of at least two stages among the plurality of stages is activated simultaneously, a first pulse width of the second scan signal output from one stage among the at least two stages is different from a second pulse width of the second scan signal output from another stage among the at least two stages.

In an embodiment, when the another stage is disposed after the one stage, the second pulse width is narrower than the first pulse width.

In an embodiment, the compensation circuit includes an inverter circuit connected to the first output node, a multiplexer circuit connected to the first output node and the inverter circuit, and a control circuit connected to the control node and controlling a state of the control node.

In an embodiment, the display panel operates during a plurality of frames. Each of the plurality of frames operates in at least one of a first mode and a second mode different from the first mode.

In an embodiment, the plurality of stages sequentially outputs the first scan signal and the second scan signal when operating in the first mode. The plurality of stages sequentially outputs the second scan signal when operating in the second mode.

In an embodiment, the one stage generates and outputs the second scan signal based on the first scan signal when the first mode and the second mode operate simultaneously.

In an embodiment, the another stage generates and outputs the second scan signal based on the first clock signal when the first mode and the second mode operate simultaneously.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
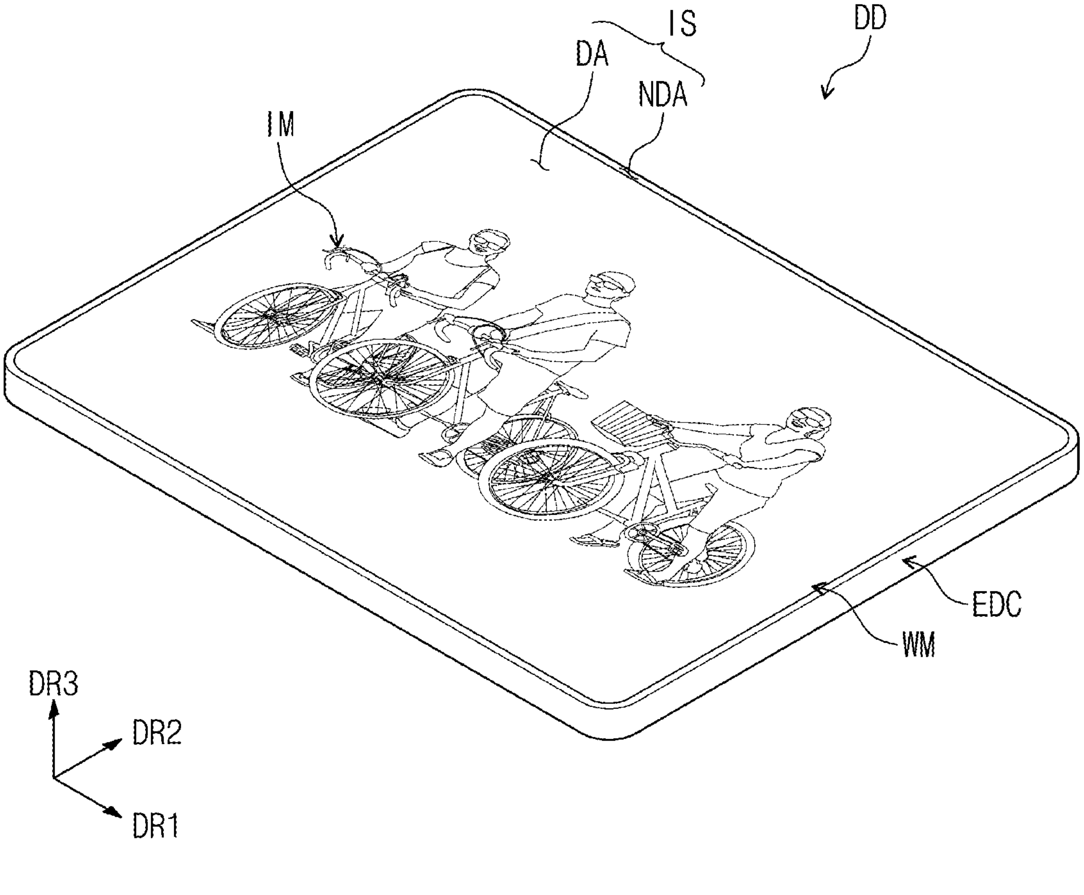
FIG. 1 is a perspective view of a display device, according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. The term "connected to" may refer to elements being electrically connected to each other. It will also be understood that when a component is referred to as being "between" two components, it can be the only component between the two components, or one or more intervening components may also be present.

The term "and/or" includes one or more combinations in each of which associated elements are defined.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that the terms "include", "comprise", "have", etc. specify the presence of features, numbers, steps, operations, elements, or components, described in the specification, or a combination thereof, and do not preclude the presence or additional possibility of one or more other features, numbers, steps, operations, elements, or components or a combination thereof.

The terms "about" or "approximately" as used herein are inclusive of the stated value and means within an acceptable range of deviation for the particular value as determined by one of ordinary skill in the art, considering the measurement in question and the error associated with measurement of the particular quantity (e.g., the limitations of the measurement system). For example, "about" or "approximately" can mean within one or more standard deviations, or within ±30%, 20%, 10% or 5% of the stated value.

Embodiments of the present disclosure provide a display device having improved display quality and reduced power consumption. The display device according to embodiments may lower power consumption by reducing the operating frequency when displaying still images, without compromising display quality. For example, a display panel may be divided into an active area including a plurality of pixels, and a peripheral area including a scan driver. The scan driver may include multiple stages that output scan signals to the pixels in the active area, with varying pulse widths for the scan signals when activated simultaneously. In embodiments, a second pulse width may be narrower than a first pulse width when a second stage follows a first stage. In embodiments, the display device may include a compensation unit (also referred to as a compensation circuit) that adjusts a second scan signal's pulse width using an inverter circuit and a multiplexer circuit, and may control a signal based on clock signals with different pulse widths.

According to embodiments of the present disclosure, the display panel may operate in multiple frames, each capable of functioning in a first mode or a second mode. The first mode may sequentially output both first and second scan signals, while the second mode may only output the second scan signal. During overlapping sections, where both modes operate simultaneously, adjustments may be made to provide high display quality. Embodiments provide a display device that dynamically adjusts its operating frequency and scan signal characteristics to balance power efficiency and display performance.

Figure 2:
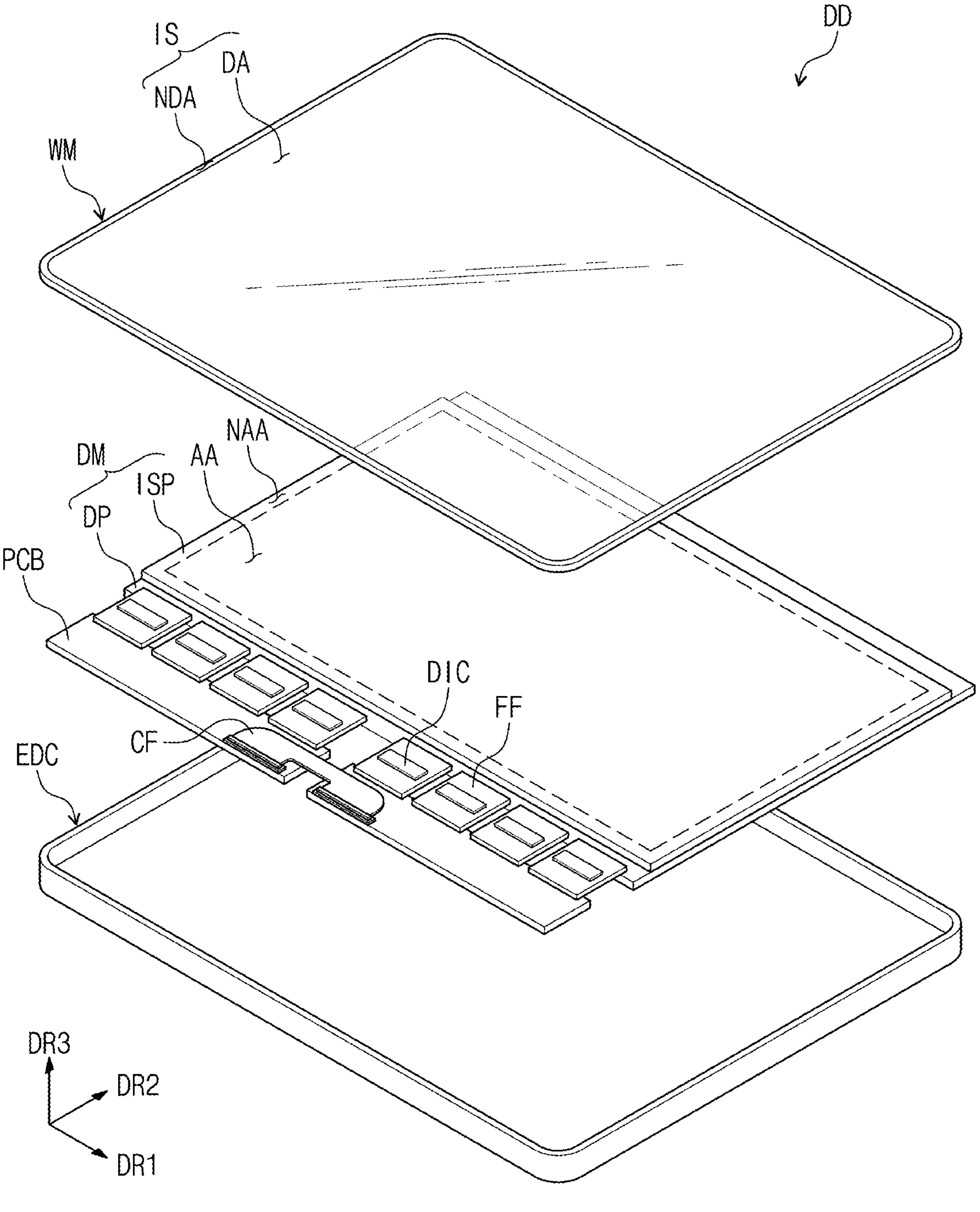
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be a device activated depending on an electrical signal. The display device DD may be a small and medium-sized electronic device, such as, for example, a mobile phone, a tablet PC, a notebook computer, a vehicle navigation system, or a game console, as well as a large-sized electronic device, such as, for example, a television or a monitor. The above examples are provided only as an example, and it is to be understood that the display device DD may be implemented as another type of a display device without departing from the concept of the present disclosure.

The display device DD may be in a shape of a rectangle having a long side in the first direction DR1 and a short side in the second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or a top surface) and a back surface (or a bottom surface) of each member are defined with respect to a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from outside of the display device DD. The external input may include various types of inputs that are provided from outside of the display device DD including, for example, inputs provided by a user. For example, the display device DD according to an embodiment of the present disclosure may sense an external input of a user, which is applied from outside of the display device DD. The external input of the user may be one of various types of external inputs, such as, for example, a part of his/her body, light, heat, his/her gaze, and pressure, or a combination thereof. Also, the display device DD may sense the external input of the user applied to a side surface or a rear surface of the display device DD depending on a structure of the display device DD. As an example of the present disclosure, an external input may include an input entered through an input device such as, for example, a stylus pen, an active pen, a touch pen, an electronic pen, or an E-pen.

A display area DA and a non-display area NDA may be defined in the display surface IS of the display device DD. The display area DA refers to an area in which the image IM is displayed. A user may perceive (or view) the image IM through the display area DA. In an embodiment, the display area DA is illustrated in the shape of a quadrangle whose vertexes are rounded. However, this is only illustrated as an example, and embodiments are not limited thereto. For example, the display area DA may have various shapes according to embodiments of the present disclosure.

The non-display area NDA may be disposed adjacent to the display area DA. The non-display area NDA may have a given color. The non-display area NDA may surround the display area DA. Accordingly, a shape of the display area DA may be defined substantially by the non-display area NDA. However, this is illustrated as an example. For example, according to embodiments, the non-display area NDA may be positioned to be disposed adjacent to only one side of the display area DA or may be omitted.

As illustrated in FIG. 2, the display device DD may include a display module DM and a window WM disposed on the display module DM. The display module DM may include a display panel DP and an input sensing layer ISP.

The display panel DP according to an embodiment of the present disclosure may be, for example, a light emitting display panel, but is not particularly limited thereto. For example, the display panel DP may be an organic light emitting display panel, a quantum dot light emitting display panel, a micro-LED display panel, or a nano-LED display panel. A light emitting layer of the organic light emitting display panel may include, for example, an organic light emitting material. A light emitting layer of the quantum dot light emitting display panel may include, for example, a quantum dot, a quantum rod, or the like. A light emitting layer of the micro-LED display panel may include, for example, a micro-LED. A light emitting layer of the nano-LED display panel may include, for example, a nano-LED.

The display panel DP may output the image IM, and the image IM thus output may be displayed through the display surface IS.

The input sensing layer ISP may be disposed on the display panel DP and may sense an external input. According to an embodiment of the present disclosure, the input sensing layer ISP may be directly disposed on the display panel DP. According to an embodiment of the present disclosure, the input sensing layer ISP may be formed on the display panel DP by a subsequent process. That is, according to an embodiment, when the input sensing layer ISP is directly disposed on the display panel DP, an inner adhesive film is not interposed between the input sensing layer ISP and the display panel DP.

The window WM may be formed of a transparent material capable of outputting the image IM. For example, the window WM may be formed of glass, sapphire, plastic, etc. Although it is illustrated that the window WM is implemented with a single layer, embodiments are not limited thereto. For example, according to an embodiment, the window WM may include a plurality of layers.

The non-display area NDA of the display device DD described above may correspond to an area that is defined by printing a material including a given color on one area of the window WM. As an example of the present disclosure, the window WM may include a light blocking pattern that defines the non-display area NDA. For example, the light blocking pattern may be a colored organic film, and may be formed, for example, in a coating manner.

The window WM may be coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer may be further disposed between the window WM and the display module DM. The anti-reflection layer decreases the reflectivity of external light incident from above the window WM. The anti-reflection layer according to an embodiment of the present disclosure may include a phase retarder and a polarizer. The phase retarder may have a film type or a liquid crystal coating type. The polarizer may also be a polarizer of a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. In this case, the anti-reflection layer may further include a light blocking pattern disposed between the color filters.

The display module DM may display the image IM depending on an electrical signal and may transmit/receive information about an external input. The display module DM may be defined by an effective area AA and a non-effective area NAA. The effective area AA may be defined as an area (e.g., an area where the image IM is displayed) through which the image IM is output from the display panel DP. Also, the effective area AA may be defined as an area in which the input sensing layer ISP senses an external input applied from outside of the display device DD. According to an embodiment, the effective area AA of the display module DM may correspond to (or overlap) at least part of the display area DA.

The non-effective area NAA is disposed adjacent to the effective area AA. The non-effective area NAA refers to an area in which the image IM is not substantially displayed. For example, the non-effective area NAA may surround the effective area AA. However, this is illustrated by way of example. The non-effective area NAA may be defined in various shapes. According to an embodiment, the non-effective area NAA of the display module DM may correspond to (or overlap) at least part of the non-display area NDA.

The display device DD may further include a plurality of flexible films FF connected to the display panel DP. A driver chip DIC may be mounted on each of the flexible films FF. As an example of the present disclosure, a data driver 200 (see FIG. 3) may include the plurality of driver chips DIC, and the plurality of driver chips DIC may be respectively mounted on the plurality of flexible films FF.

The display device DD may further include at least one printed circuit board PCB coupled to the plurality of flexible films FF. As an example of the present disclosure, four printed circuit boards PCBs are provided in the display device DD, but the number of printed circuit boards PCBs is not limited thereto. Two adjacent printed circuit boards PCBs among the printed circuit boards PCBs may be electrically connected to each other by a connection film CF. Also, at least one of the printed circuit boards PCBs may be electrically connected to a main board. A driving controller 100 (see FIG. 3) and a voltage generator 400 (see FIG. 3) may be disposed on at least one of the printed circuit boards PCBs.

FIG. 2 illustrates a structure in which the driver chips DIC are respectively mounted on the flexible films FF, but the present disclosure is not limited thereto. For example, according to embodiments, the driver chips DIC may be directly mounted on the display panel DP. In this case, a portion of the display panel DP, on which the driver chip DIC is mounted, may be bent such that the driver chip DIC is disposed on a rear surface of the display module DM.

The input sensing layer ISP may be electrically connected to the printed circuit board PCB through the flexible films FF. However, embodiments of the present disclosure are not limited thereto. That is, the display module DM may additionally include a separate flexible film that electrically connects the input sensing layer ISP and the printed circuit board PCB.

The display device DD further includes a housing EDC accommodating the display module DM. The housing EDC may be coupled with the window WM to define the exterior appearance of the display device DD. The housing EDC may absorb external shocks and may prevent a foreign material/substance/moisture or the like from being infiltrated into the display module DM such that components accommodated in the housing EDC are protected. As an example of the present disclosure, the housing EDC may be provided in the form of a combination of a plurality of accommodating members.

The display device DD according to an embodiment may further include an electronic module including various functional modules for operating the display module DM, a power supply module (e.g., a battery) for supplying power utilized for overall operations of the display device DD, a bracket coupled with the display module DM and/or the housing EDC to partition an inner space of the display device DD, etc.

Figure 3:
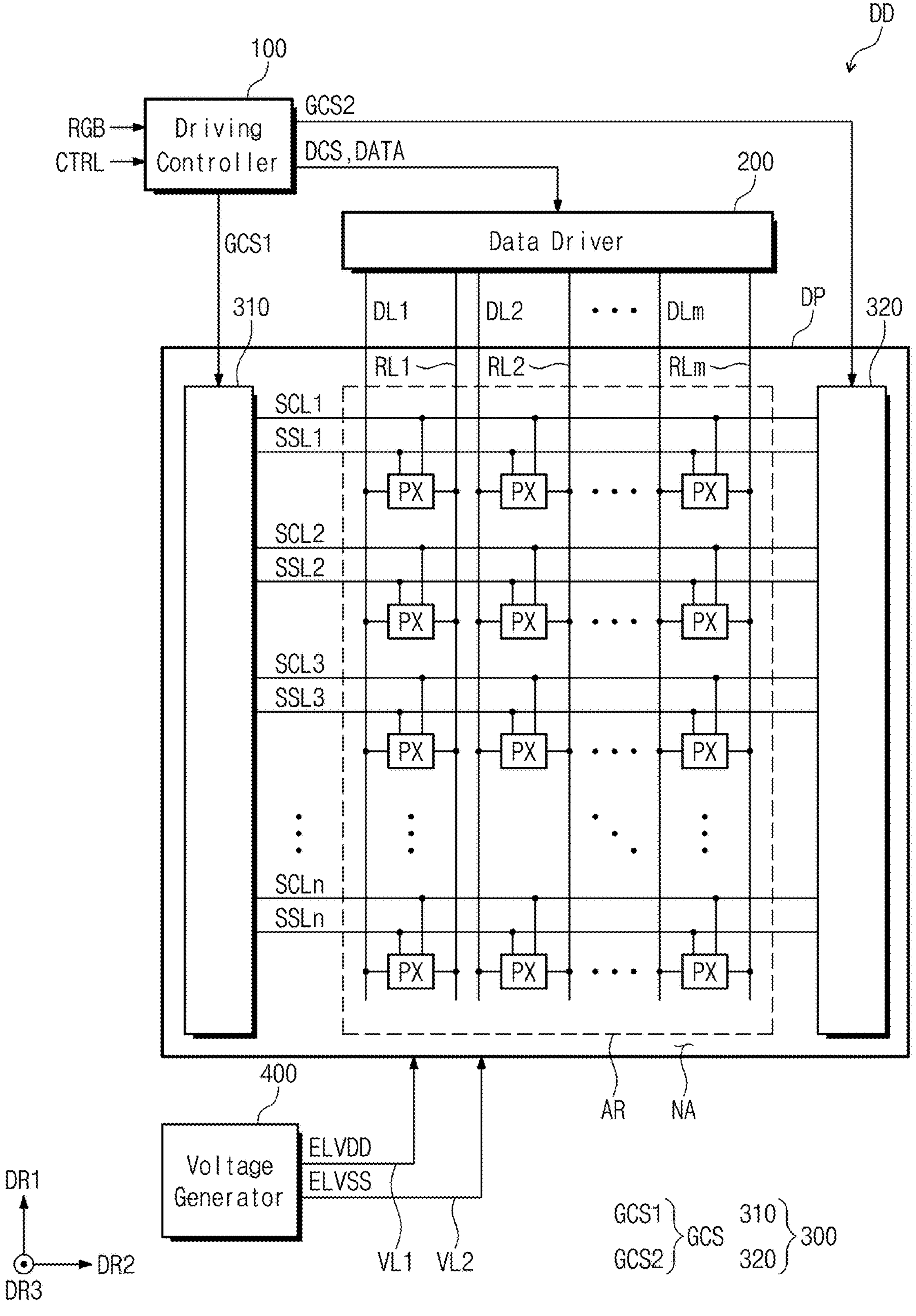
FIG. 3 is a block diagram of a display device, according to an embodiment of the present disclosure.

FIG. 3 is a block diagram of a display device, according to an embodiment of the present disclosure.

Referring to FIG. 3, the display device DD may include a driving controller 100, a data driver 200, the display panel DP, and a voltage generator 400.

The display panel DP may include a scan driver 300 (also referred to as a scan driver circuit), a plurality of first scan lines SCL1 to SCLn, a plurality of second scan lines SSL1 to SSLn, a plurality of data lines DL1 to DLm, a plurality of sensing lines RL1 to RLm, and a plurality of pixels PX, where each of n and m is a positive integer. The plurality of first scan lines SCL1 to SCLn may be referred to as “driving scan lines”. The plurality of second scan lines SSL1 to SSLn may be referred to as “sensing scan lines”.

The active area AR and the peripheral area NA may be defined in the display panel DP. The plurality of pixels PX may be arranged in the active area AR. The scan driver 300 may be disposed in the peripheral area NA. The peripheral area NA may be disposed adjacent to the active area AR. The active area AR may correspond to the display area DA (see FIG. 1). The peripheral area NA may correspond to the non-display area NDA (see FIG. 1).

Each of the plurality of first scan lines SCL1 to SCLn may extend in the second direction DR2. The plurality of first scan lines SCL1 to SCLn may be arranged spaced apart from each other in the first direction DR1.

Each of the plurality of second scan lines SSL1 to SSLn may extend in the second direction DR2. The plurality of second scan lines SSL1 to SSLn may be arranged spaced apart from each other in the first direction DR1.

Each of the plurality of data lines DL1 to DLm may extend in the first direction DR1 from the data driver 200. The plurality of data lines DL1 to DLm may be arranged spaced apart from each other in the second direction DR2.

Each of the plurality of sensing lines RL1 to RLm may extend in the first direction DR1 from the data driver 200. The plurality of sensing lines RL1 to RLm may be arranged spaced apart from each other in the second direction DR2.

The plurality of pixels PX may be electrically connected to the plurality of first scan lines SCL1 to SCLn, the plurality of second scan lines SSL1 to SSLn, the plurality of data lines DL1 to DLm, and the plurality of sensing lines RL1 to RLm. Each of the plurality of pixels PX may be electrically connected to two scan lines. However, this is an example, and the number of scan lines connected to each of the plurality of pixels PX according to embodiments of the present disclosure is not limited thereto.

The driving controller 100 may receive an input image signal RGB and a control signal CTRL from a main controller (e.g., a microcontroller or graphics processing unit (GPU)). The driving controller 100 may generate image data DATA by converting the input image signal RGB.

The driving controller 100 may generate a scan control signal GCS and a data control signal DCS based on the control signal CTRL. The data driver 200 may receive the data control signal DCS and the image data DATA from the driving controller 100. The data driver 200 may convert the image data DATA into data signals in response to the data control signal DCS. The data driver 200 may output data signals to the plurality of data lines DL1 to DLm. The data signals may be analog voltages corresponding to grayscale values of the image data DATA.

The data driver 200 may be connected to the plurality of sensing lines RL1 to RLm. The data driver 200 may further receive a sensing control signal from the driving controller 100, and may sense the characteristics of elements included in each of the pixels PX of the display panel DP in response to a sensing control signal.

As an example of the present disclosure, the data driver 200 may be formed in a form of at least one chip. For example, the data driver 200 may be disposed in the driver chips DIC shown in FIG. 2.

The scan driver 300 may receive the scan control signal GCS from the driving controller 100. The scan driver 300 may output scan signals in response to the scan control signal GCS. The scan driver 300 may include a plurality of transistors, which will be described in further detail below.

The scan driver 300 may generate a first scan signal and a second scan signal in response to the scan control signal GCS. The first scan signal may be referred to as a driving scan signal. The second scan signal may be referred to as a sensing scan signal. The first scan signal may be applied to the plurality of first scan lines SCL1 to SCLn. The second scan signal may be applied to the plurality of second scan lines SSL1 to SSLn.

As an example of the present disclosure, the scan driver 300 may include a first scan driver 310 and a second scan driver 320. The first scan driver 310 may be disposed on the left side of the active area AR. The second scan driver 320 may be disposed on the right side of the active area AR. The first scan driver 310 may receive a first scan control signal GCS1 from the driver controller 100, and the second scan driver 320 may receive a second scan control signal GCS2 from the driver controller 100. The first scan driver 310 may generate a plurality of first scan signals and a plurality of second scan signals in response to the first scan control signal GCS1. The second scan driver 320 may generate a plurality of first scan signals and a plurality of second scan signals in response to the second scan control signal GCS2.

FIG. 3 shows a structure in which the first and second scan drivers 310 and 320 are respectively positioned on the left and right sides of the active area AR. However, the present disclosure is not limited thereto. For example, according to embodiments, the scan driver 300 may include only one of the first and second scan drivers 310 and 320.

Each of the plurality of pixels PX may receive a first driving voltage ELVDD and a second driving voltage ELVSS.

The voltage generator 400 may generate voltages utilized for the operation of the display panel DP. In an embodiment of the present disclosure, the voltage generator 400 may generate the first driving voltage ELVDD and the second driving voltage ELVSS, which are utilized for the operation of the display panel DP. The first driving voltage ELVDD and the second driving voltage ELVSS may be provided to the display panel DP through a first driving voltage line VL1 and a second driving voltage line VL2, respectively.

In addition to generating the first driving voltage ELVDD and the second driving voltage ELVSS, the voltage generator 400 may further generate various voltages (e.g., a gamma reference voltage, a data driving voltage, a high voltage VGH (see FIG. 12B), and a low voltage VGL (see FIG. 12B)) utilized for operations of the source driver 200 and the scan driver 300.

Figure 4:
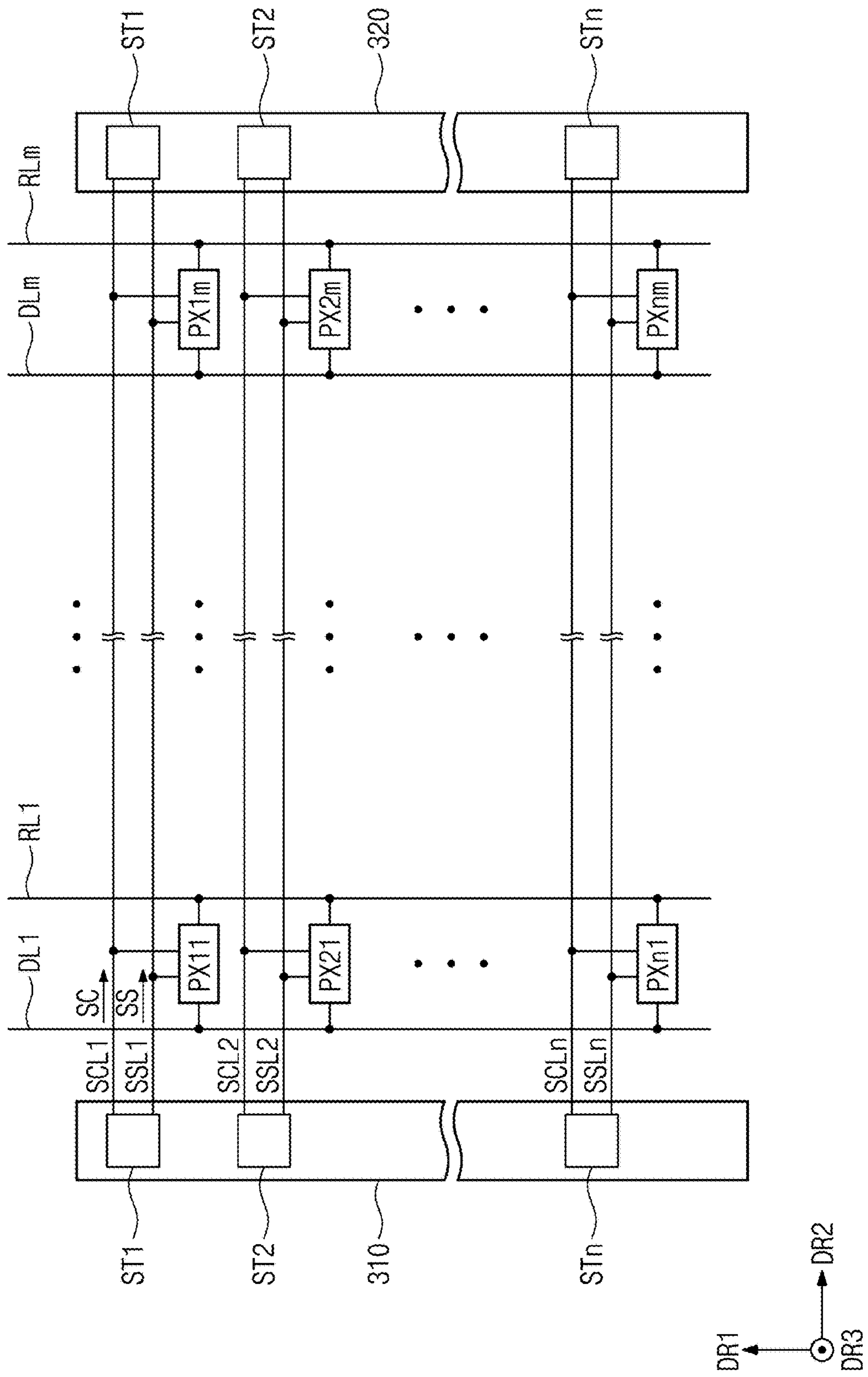
FIG. 4 is a block diagram showing a scan driver and a plurality of pixels, according to an embodiment of the present disclosure.

FIG. 4 is a block diagram showing a scan driver and a plurality of pixels, according to an embodiment of the present disclosure.

Referring to FIG. 4, among a plurality of pixels PX11 to PXnm, where each of n and m is a positive integer, pixels (e.g., PX11 to PX1*m*) disposed in the same row may be connected to two scan lines (e.g., SCL1 and SSL1). Among the plurality of pixels PX11 to PXnm, pixels (e.g., PX11 to PXn1) disposed in the same column may be connected to one data line (e.g., DL1) and one sensing line (e.g., RL1).

The first scan driver 310 may be connected to one side of the scan lines SCL1 to SCLn and SSL1 to SSLn, and the second scan driver 320 may be connected to another side (e.g., an opposing side) of the scan lines SCL1 to SCLn and SSL1 to SSLn.

Each of the first and second scan drivers 310 and 320 may include the plurality of stages ST1 to STn arranged sequentially. As an example of the present disclosure, each of a plurality of stages ST1 to STn may output a first scan signal SC and a second scan signal SS.

For example, the first stage ST1 may be connected to the first scan line SCL1 and the second scan line SSL1. The first stage ST1 may output the first scan signal SC to the first scan line SCL1, and may output the second scan signal SS to the second scan line SSL1.

Figure 5:
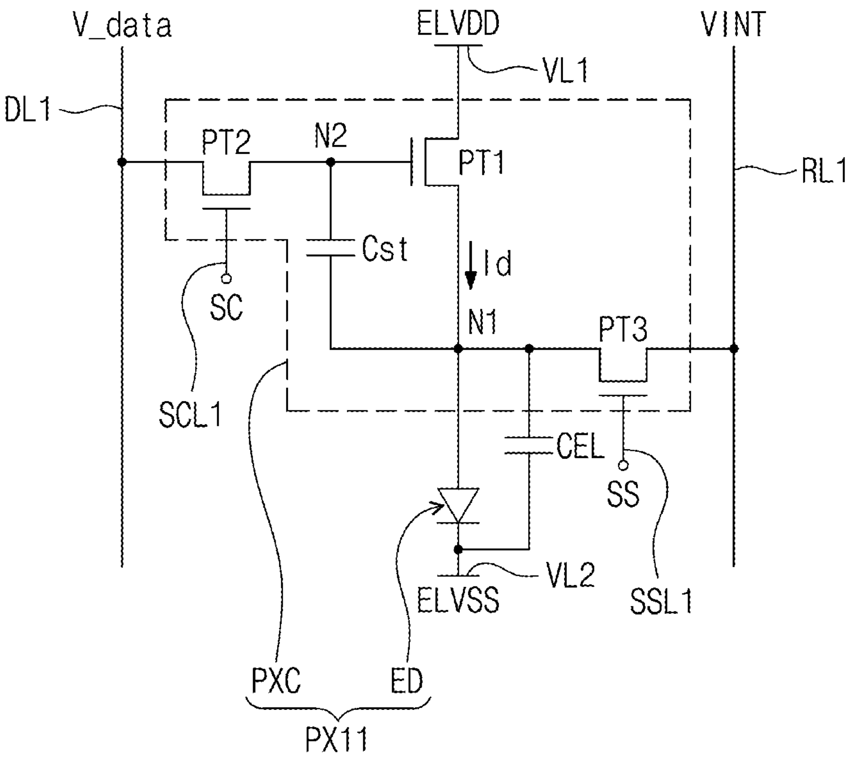
FIG. 5 is an equivalent circuit diagram of a pixel, according to an embodiment of the present disclosure.

FIG. 5 is an equivalent circuit diagram of a pixel, according to an embodiment of the present disclosure.

FIG. 5 shows an equivalent circuit diagram of one pixel PX11 among the plurality of pixels PX11 to PXnm (see FIG. 4) shown in FIG. 4, where each of n and m is a positive integer. Because each of the plurality of pixels PX11 to PXnm (see FIG. 4) has the same circuit structure of the pixel PX11, a detailed description of the pixels other than the pixel PX11 is omitted for convenience of explanation.

Referring to FIG. 5, the pixel PX11 may be electrically connected to the corresponding lines including the first data line DL1, the first scan line SCL1, and the second scan line SSL1, and the sensing line RL1.

The pixel PX11 may include a light emitting element ED and a pixel circuit unit PXC that controls light emission of the light emitting element ED.

The light emitting element ED may be a light emitting diode. As an example of the present disclosure, the light emitting element ED may be an organic light emitting diode including an organic light emitting layer. The light emitting element ED may be one of, for example, a red light emitting diode that emits red light, a green light emitting diode that emits green light, and a blue light emitting diode that emits blue light.

The pixel circuit unit PXC may include a plurality of transistors and at least one capacitor. For example, the pixel circuit unit PXC may include first to third transistors PT1, PT2, and PT3 and a capacitor Cst. Each of the first to third transistors PT1, PT2, and PT3 may be an N-type transistor. However, the present disclosure is not limited thereto. For example, in an embodiment, each of the first to third transistors PT1, PT2, and PT3 may be a P-type transistor. Alternatively, in an embodiment, some of the first to third transistors PT1, PT2, and PT3 may be N-type transistors, and the other(s) thereof may be P-type transistors. Moreover, in an embodiment, at least one of the first to third transistors PT1, PT2, and PT3 may be a transistor having a low-temperature polycrystalline silicon (LTPS) semiconductor layer.

The pixel circuit unit PXC may be formed through the same process as the scan driver 300.

The first transistor PT1 may be connected between a first driving voltage line VL1 that receives the first driving voltage ELVDD, and the light emitting element ED. The first transistor PT1 includes a first electrode connected to the first driving voltage line VL1, a second electrode connected to an anode of the light emitting element ED, and a third electrode connected to one end of the capacitor Cst. Here, a contact point where the anode of the light emitting element ED is connected to the second electrode of the first transistor PT1 may be referred to as a first node N1. In this specification, "a transistor is connected to a signal line" means that one of a first electrode, a second electrode, and a third electrode of the transistor is integrated with a signal line or is connected through a connection electrode. Also, "a transistor is electrically connected to another transistor" means that one of a first electrode, a second electrode, and a third electrode of the transistor is integrated with one of a first electrode, a second electrode, and a third electrode of the other transistor, or is connected through a connection electrode.

The first transistor PT1 may receive a data voltage V_data delivered through the data line DL1 depending on the switching operation of the second transistor PT2 and then may supply a driving current to the light emitting element ED.

The second transistor PT2 is connected between the data line DL1 and the third electrode of the first transistor PT1. The second transistor PT2 includes a first electrode connected to the first data line DL1, a second electrode connected to a third electrode of the first transistor PT1, and a third electrode connected to the first scan line SCL1. Here, a contact point to which the second electrode of the second transistor PT2 is connected to the third electrode of the first transistor PT1 may be referred to as a second node N2. The second transistor PT2 is turned on in response to a first scan signal SC received through the first scan line SCL1 and may deliver the data voltage V_data delivered from the first data line DL1 to the third electrode of the first transistor PT1.

The third transistor PT3 is connected between the second electrode of the first transistor PT1 and a sensing line RL1. The third transistor PT3 includes a first electrode connected to the first node N1, a second electrode connected to the sensing line RL1, and a third electrode connected to the second scan line SSL1. The third transistor PT3 is turned on in response to the second scan signal SS received through the second scan line SSL1 so as to electrically connect the sensing line RL1 and the first node N1.

One end of the capacitor Cst is connected to the second node N2, and the other end thereof is connected to the first node N1. The cathode of the light emitting element ED may be connected to the second driving voltage line VL2, to which the second driving voltage ELVSS is delivered. A voltage level of the second driving voltage ELVSS may be lower than a voltage level of the first driving voltage ELVDD.

The light emitting element ED may include an anode connected to the second electrode (or the first node N1) of the first transistor PT1 and a cathode receiving the second driving voltage ELVSS. The light emitting element ED may generate light corresponding to the amount of current supplied from the first transistor PT1. A light emitting capacitor CEL may be defined between the anode and cathode of the light emitting element ED.

Figure 6:
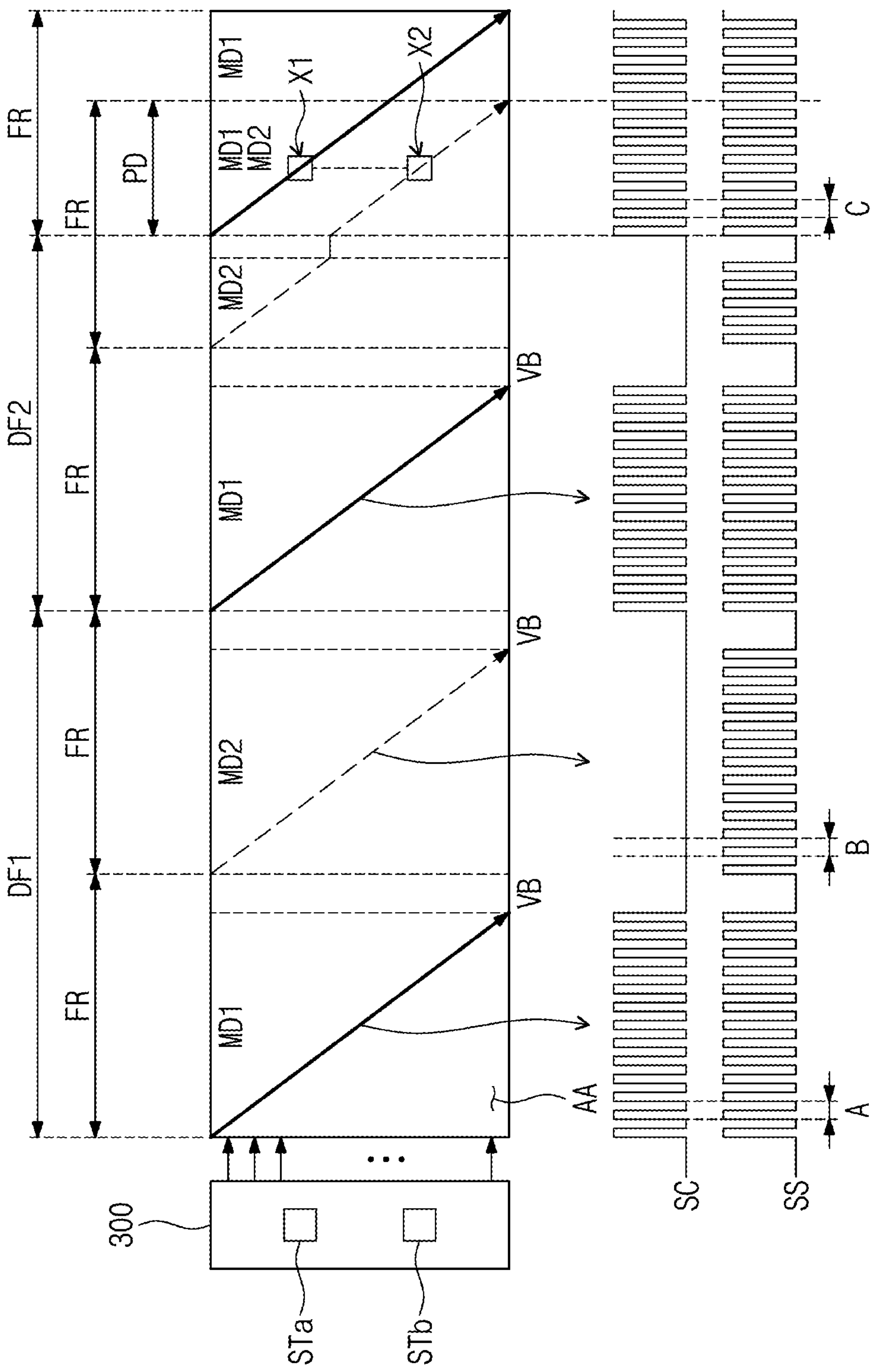
FIG. 6 is a conceptual diagram showing an operation of a display device, according to an embodiment of the present disclosure.

FIG. 6 is a conceptual diagram showing an operation of a display device, according to an embodiment of the present disclosure.

Referring to FIGS. 3 and 6, the display panel DP may operate during a plurality of frames FR. The display panel DP may display the image IM (see FIG. 1) in units of a driving frame DF1 or DF2 generated based on the plurality of frames FR.

Each of the plurality of frames FR may operate in a first mode MD1 or a second mode MD2. The display device DD may change an operating frequency by using the frame FR operating in the second mode MD2. Each of the plurality of frames FR may further include a blank section VB. The blank section VB may be provided after each of the plurality of frames FR operates in the first mode MD1 or the second mode MD2.

FIG. 6 shows the first scan signal SC and/or the second scan signal SS sequentially driven in an arrow direction.

When operating only in the first mode MD1, each of the plurality of stages ST1 and ST2 to STn (see FIG. 4), where n is a positive integer, may output the first scan signal SC and the second scan signal SS. A first section 'A' may be defined as one section of the first scan signal SC and the second scan signal SS, which operate in the first mode MD1.

When operating only in the second mode MD2, each of the plurality of stages ST1 and ST2 to STn (see FIG. 4) may output the second scan signal SS. A second section 'B' may be defined as one section of the second scan signal SS, which operates in the second mode MD2.

According to an embodiment of the present disclosure, the display device DD may synchronize the frame generation timing of a graphics processing device included in the display device DD with the frame output timing of the display panel DP. In other words, the display panel DP may operate with a variable operating frequency. For example, in specific operating environments such as displaying still images, the operating frequency of the display panel DP may be lowered. Accordingly, a display device DD having reduced power consumption may be provided.

Each of the plurality of frames FR may have a time of about 2.1 milliseconds (ms). In this case, each of the plurality of frames FR may have a frequency of about 480 hertz (Hz). However, this is an example, and the time of each of the plurality of frames FR according to embodiments of the present disclosure is not limited thereto. For example, each of the plurality of frames FR may have the time of about 4.2 ms according to embodiments.

For example, when the graphics processing device generates a driving frame DF1 having an operating frequency of about 240 Hz, the scan driver 300 may control the frame FR to drive the first mode MD1 once and to drive the second mode MD2 once during the driving frame DF1 such that the display panel DP operates at an operating frequency of about 240 Hz.

When the graphics processing device generates a driving frame having an operating frequency of about 160 Hz, the scan driver 300 may control the frame FR to drive the frame FR operating in the first mode MD1 once and to drive the frame FR operating in the second mode MD2 twice during a driving frame such that the display panel DP operates at an operating frequency of about 160 Hz.

As such, when controlling an operating frequency by using the entire frame FR operating in the second mode MD2, the display panel DP may be defined as operating at an integer-multiple variable frequency during the first driving frame DF1 at this time.

For example, when the graphics processing device generates the driving frame DF2 having an operating frequency of about 360 Hz, the scan driver 300 may control the frame FR to drive the frame FR operating in the first mode MD1 once during the driving frame DF2, and may allow the display panel DP to operate at an operating frequency of about 360 Hz by using a part of the frame FR operating in the second mode MD2.

As such, when controlling an operating frequency by using a part of the frame FR operating in the second mode MD2, the display panel DP may be defined as operating at a non-integer-multiple variable frequency during the second driving frame DF2 at this time.

The frame FR after the second driving frame DF2 operating at the non-integer-multiple variable frequency may overlap the rest of the frame FR operating in the second mode MD2, which is previously included in the second driving frame DF2. The section at this time may be defined as an overlapping section PD.

In the overlapping section PD, the first mode MD1 and the second mode MD2 may operate simultaneously.

Pixels X1 and X2 disposed in the same column may be defined as pixels respectively operating in the first mode MD1 and the second mode MD2 in the overlapping section PD.

FIG. 6 shows a first stage STa and a second stage STb respectively operating the pixels X1 and X2 among the plurality of stages ST1 and ST2 to STn (see FIG. 4).

The first pixel X1 may operate in the first mode MD1. The first stage STa may provide the first pixel X1 with the first scan signal SC and the second scan signal SS. The second pixel X2 may operate in the second mode MD2. The second stage STb may provide the second scan signal SS to the second pixel X2.

In the overlapping section PD, each of the first stage STa and the second stage STb may output the second scan signal SS at the same time. In the overlapping section PD, the first stage STa operating in the first mode MD1 may output the first scan signal SC and the second scan signal SS, and the second stage STb operating in the second mode MD2 may output the second scan signal SS.

A third section 'C' may be defined as a section of the first scan signal SC and the second scan signal SS respectively operating in the first mode MD1 and the second mode MD2.

Figure 7:
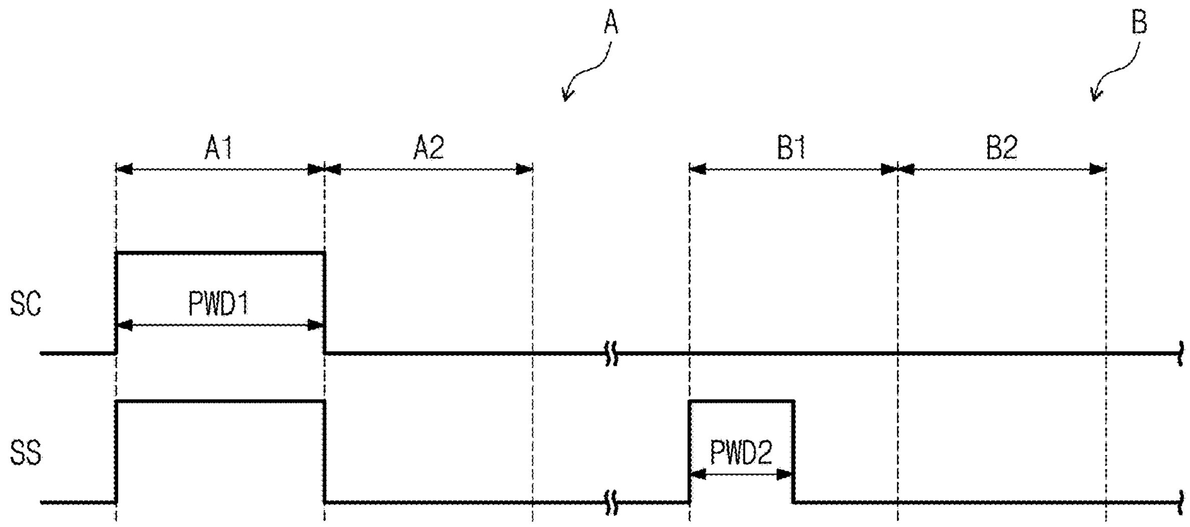
FIG. 7 is a waveform diagram showing a first scan signal and a second scan signal in a first section and a second section, according to an embodiment of the present disclosure.

FIG. 7 is a waveform diagram showing a first scan signal and a second scan signal in a first section and a second section, according to an embodiment of the present disclosure.

FIG. 7 shows waveforms of the first scan signal SC (see FIG. 6) and the second scan signal SS (see FIG. 6) operating in the first section 'A' (see FIG. 6) and the second section 'B' (see FIG. 6).

Referring to FIGS. 5, 6, and 7, during the first mode MD1, the first section 'A' may be repeated. The first section 'A' may be referred to as a programming section. The first section 'A' may include a 1-1st sub-section A1 and a 1-2nd sub-section A2. The 1-1st sub-section A1 and the 1-2nd sub-section A2 may be consecutive to each other. The 1-2nd sub-section A2 may be the remaining section after an operation of the 1-1st sub-section A1 is completed in the first section 'A'.

During the sub-section A1, each of the first scan signal SC and the second scan signal SS may be activated.

The activation section of the first scan signal SC may overlap the activation section of the second scan signal SS. As an example of the present disclosure, the activation section may be defined as a high level section. The activation section of each of the first scan signal SC and the second scan signal SS may have a first pulse width PWD1. For example, the first pulse width PWD1 may be 2 horizontal periods.

The second transistor PT2 may be turned on in response to the first scan signal SC, and the third transistor PT3 may be turned on in response to the second scan signal SS.

The data voltage V_data may be applied to the second node N2 through the data line DL1 and the second transistor PT2 turned on. That is, the data voltage V_data may be applied to the third electrode of the first transistor PT1.

The initialization voltage VINT may be applied to the first node N1 through the sensing line RL1 and the turned-on third transistor PT3. That is, the initialization voltage VINT may be applied to the second electrode of the first transistor PT1 and the anode of the light emitting element ED. In this case, the light emitting capacitor CEL of the light emitting element ED may be discharged.

A voltage between the first node N1 and the second node N2 may be set to a difference between the data voltage V_data and the initialization voltage VINT. Electric charges corresponding to the difference between the data voltage V_data and the initialization voltage VINT may be charged in the capacitor Cst. A voltage between the first node N1 and the second node N2 may be defined as a gate-source voltage of the first transistor PT1.

During the 1-2nd sub-section A2, the first scan signal SC and the second scan signal SS may be deactivated. The second transistor PT2 and the third transistor PT3 may be turned off.

A current may flow to the light emitting diode ED depending on the voltage between the gate and source of the first transistor PT1. In response to the current, the light emitting diode ED may emit light. At this time, the light emitting capacitor CEL may be charged by the flowing current.

During the second mode MD2, the second section 'B' may be repeated. The second section 'B' may be referred to as an initial section. The second section 'B' may include a 2-1st sub-section B1 and a 2-2nd sub-section B2. The 2-1st sub-section B1 and the 2-2nd sub-section B2 may be consecutive to each other. The 2-2nd sub-section B2 may be the remaining section after an operation of the 2-1st sub-section B1 is completed in the second section 'B'.

During the 2-1st sub-section B1, the first scan signal SC may be deactivated, and the second scan signal SS may be activated. The activation section of the second scan signal SS may have a second pulse width PWD2. However, this is an example, and the pulse width of the activation section of the second scan signal SS during the 2-1st sub-section B1 is not limited thereto. For example, in an embodiment, the activation section of the second scan signal SS during the 2-1st sub-section B1 may have the first pulse width PWD1. The second pulse width PWD2 may be different from the first pulse width PWD1. The second pulse width PWD2 may be narrower than the first pulse width PWD1.

The second transistor PT2 may be turned off in response to the first scan signal SC, and the third transistor PT3 may be turned on in response to the second scan signal SS.

Even though the transistor PT2 is turned off, the voltage between the first node N1 and the second node N2 may be maintained by the capacitor Cst. That is, the voltage between the gate and the source may be maintained.

For example, during the first section 'A', a voltage level of the first node N1 may be the anode voltage Vanode of the light emitting diode ED, and a voltage level of the second node N2 may be a value obtained by adding the anode voltage Vanode and a voltage Vgs between the gate and the source. During the second section 'B', the voltage level of the first node N1 may be a value obtained by subtracting the initialization voltage VINT from the anode voltage Vanode, and the voltage level of the second node N2 may be a value obtained by adding the voltage Vgs between the gate and the source to the anode voltage Vanode and subtracting the initialization voltage VINT from the added result. That is, the gate-source voltage Vgs between the second node N2 and the first node N1 may be maintained constant.

The initialization voltage VINT may be applied to the first node N1 through the sensing line RL1 and the turned-on third transistor PT3. That is, the initialization voltage VINT may be applied to the second electrode of the first transistor PT1 and the anode of the light emitting element ED. In this case, the light emitting capacitor CEL of the light emitting element ED may be discharged.

Referring to a comparative example, when the 2-1st sub-section B1 is not present, the charging time of the light emitting capacitor CEL may be increased due to the light emitting sections in the 1-2nd sub-section A2 and the 2-2nd sub-section B2. The voltage of the first node N1 may be increased by charging the light emitting capacitor CEL. The luminance may be increased by increasing the current flowing through the light emitting diode ED. However, according to an embodiment of the present disclosure, the second section 'B' may include the 2-1st sub-section B1. During the 2-1st sub-section B1, the light emitting capacitor CEL of the light emitting element ED may be discharged. The luminance of light emitted from the light emitting diode ED may be maintained constant. Accordingly, a display device DD (see FIG. 1) having improved display quality may be provided.

Figure 8:
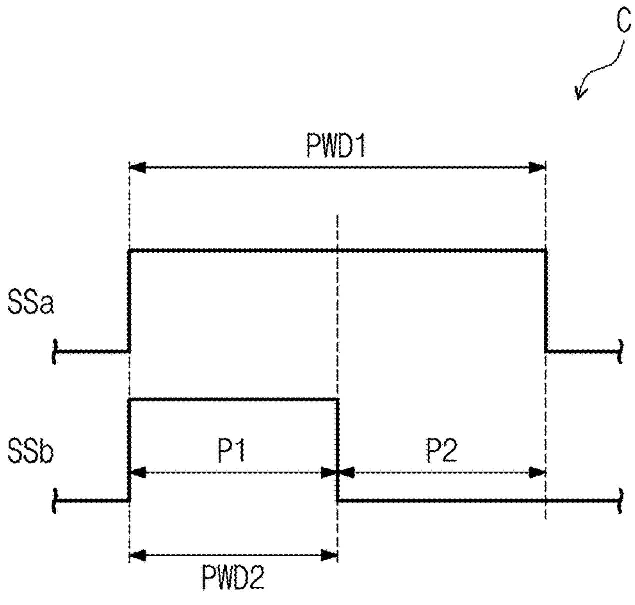
FIG. 8 is a waveform diagram showing second scan signals in part of a third section, according to an embodiment of the present disclosure.
Figure 9:
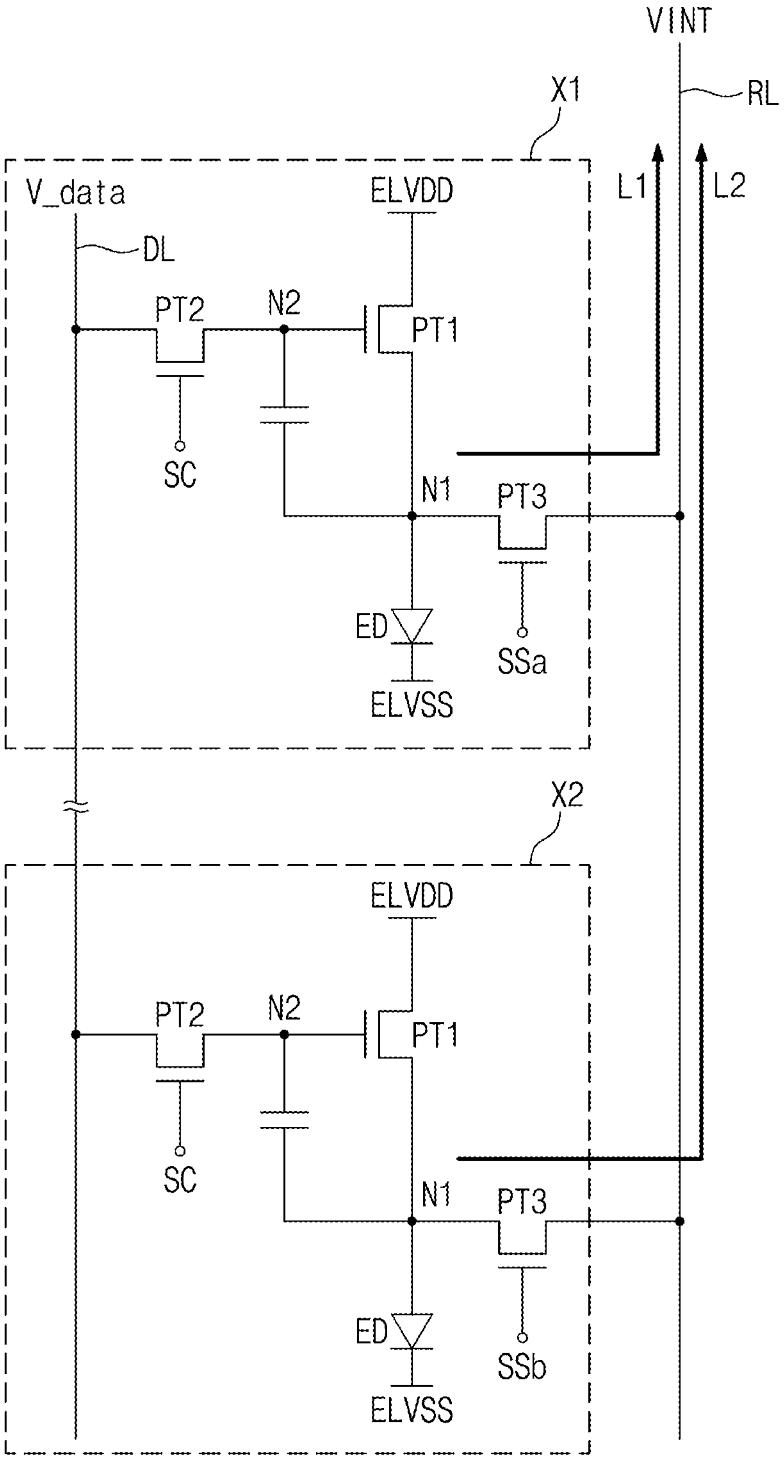
FIG. 9 shows operations of pixels in a first portion, according to an embodiment of the present disclosure.
Figure 10:
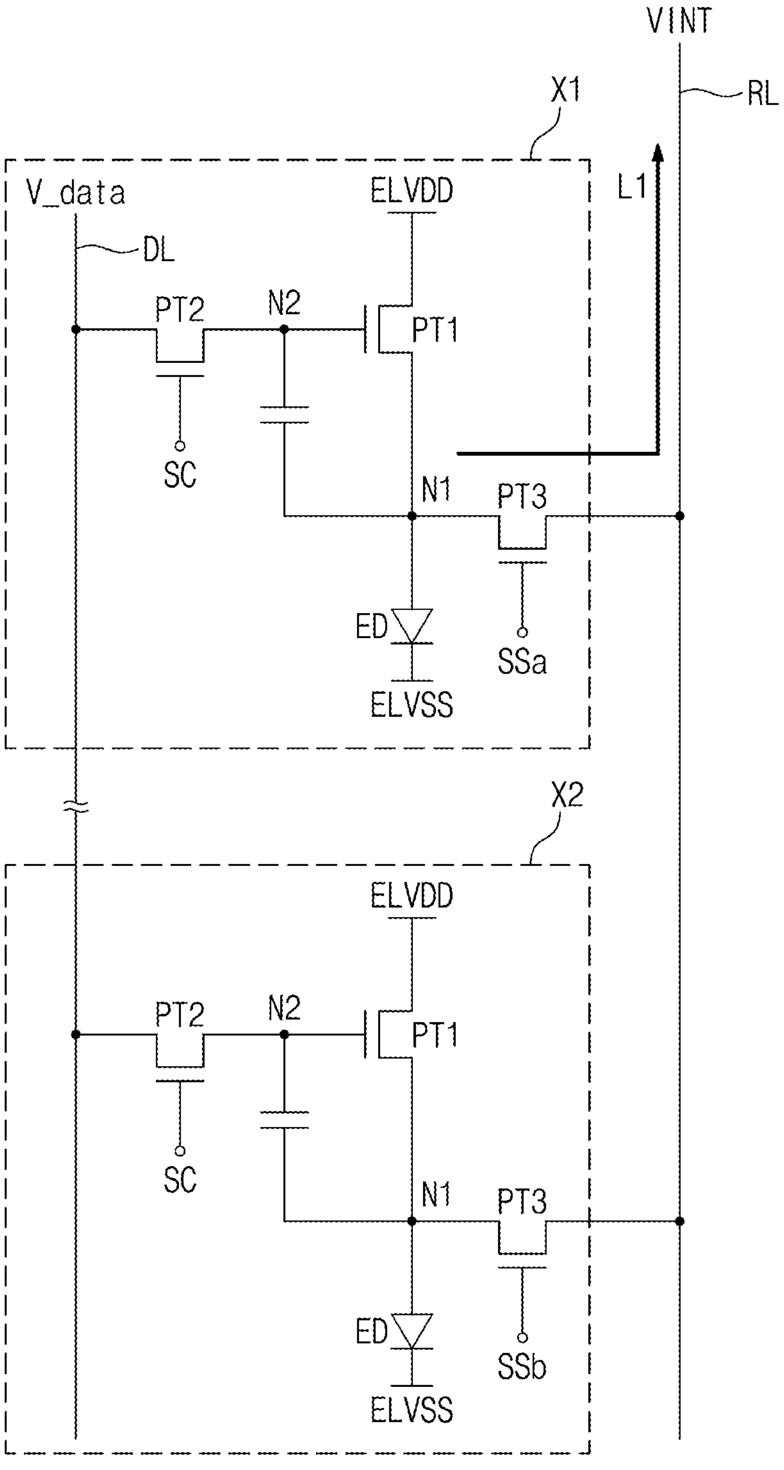
FIG. 10 shows operations of pixels in a second portion, according to an embodiment of the present disclosure.

FIG. 8 is a waveform diagram showing second scan signals in part of a third section, according to an embodiment of the present disclosure. FIG. 9 shows operations of pixels in a first portion, according to an embodiment of the present disclosure. FIG. 10 shows operations of pixels in a second portion, according to an embodiment of the present disclosure. When referring to FIGS. 9 and 10, for convenience of explanation and to avoid redundancy, the same reference numerals are assigned to the same components described with reference to FIG. 5.

Referring to FIGS. 6, 8, 9, and 10, the overlapping section PD may be a section in which the first mode MD1 and the second mode MD2 are driven simultaneously. For example, in operating at a non-integer-multiple variable frequency, when the next frame FR is started while the one frame FR is not completed, the next frame FR may operate simultaneously while the one frame FR is operating.

The third section 'C' may be repeated during the overlapping section PD. The third section 'C' of the first stage STa may be a programming section, and the third section 'C' of the second stage STb may be an initial section.

In the overlapping section PD, the first pixel X1 may operate in the first mode MD1, and the second pixel X2 may operate in the second mode MD2.

The first stage STa may provide the second scan signal SS to the first pixel X1. The second scan signal SS output to the first pixel X1 may be defined as a 2-1st scan signal SSa.

The second stage STb may provide the second scan signal SS to the second pixel X2. The second stage STb may be disposed after the first stage STa. The second scan signal SS output to the second pixel X2 may be defined as a 2-2nd scan signal SSb.

When the second scan signal SS output from each of the first stage STa and the second stage STb is activated simultaneously, the first pulse width PWD1 of the 2-1st scan signal SSa may be different from the second pulse width PWD2 of the 2-2nd scan signal SSb. The second pulse width PWD2 may be narrower than the first pulse width PWD1. For example, the second pulse width PWD2 may be half of the first pulse width PWD1. In this case, the second pulse width PWD2 may be 1 horizontal period.

FIG. 9 shows operations of the first pixel X1 and the second pixel X2 in a first portion P1.

Each of the 2-1st scan signal SSa and the 2-2nd scan signal SSb may be activated in the first portion P1.

The first pixel X1 may operate in the first mode MD1. The first scan signal SC and the 2-1st scan signal SSa may be activated. The second transistor PT2 and the third transistor PT3 of the first pixel X1 may be turned on. In this case, the initialization voltage VINT may be applied to the first node N1 of the first pixel X1 through a first path L1. During the first portion P1, the first node N1 of the first pixel X1 may be initialized by the initialization voltage VINT.

The second pixel X2 may operate in the second mode MD2. The first scan signal SC may be deactivated, and the 2-2nd scan signal SSb may be activated. The third transistor PT3 of the second pixel X2 may be turned on. At this time, the initialization voltage VINT may be applied to the first node N1 of the second pixel X2 through a second path L2. During the first portion P1, the light emitting capacitor CEL (see FIG. 5) of the second pixel X2 may be discharged.

In the first portion P1, the initialization voltage VINT may be applied to the first pixel X1 and the second pixel X2 through the first path L1 and the second path L2, respectively.

FIG. 10 shows operations of the first pixel X1 and the second pixel X2 in a second portion P2, according to an embodiment of the present disclosure.

In the second portion P2, the 2-1st scan signal SSa may be activated, and the 2-2nd scan signal SSb may be deactivated.

The first pixel X1 may operate in the first mode MD1. The first scan signal SC and the 2-1st scan signal SSa may be activated. The second transistor PT2 and the third transistor PT3 of the first pixel X1 may be turned on. In this case, the initialization voltage VINT may be applied to the first node N1 of the first pixel X1 through the first path L1. During the second portion P2, the first node N1 of the first pixel X1 may be initialized by the initialization voltage VINT. During the second portion P2, the initialization voltage VINT may be applied only to pixels operating in the first mode MD1.

The second pixel X2 may operate in the second mode MD2. However, the first scan signal SC and the 2-2nd scan signal SSb may be deactivated by operations in the overlapping section PD.

That is, the second pulse width PWD2 of the second scan signal SS output from a stage operating in the second mode MD2 among the plurality of stages ST1 to STn (see FIG. 4) may be controlled in the overlapping section PD. The first pulse width PWD1 of the second scan signal SS output from a stage operating in the first mode MD1 among the plurality of stages ST1 to STn (see FIG. 4) in the overlapping section PD may be wider than the second pulse width PWD2.

Referring to a comparative example, when the pulse width of the 2-1st scan signal SSa is the same as the pulse width of the 2-2nd scan signal SSb, the initialization voltage VINT in the overlapping section PD may always be applied to the first pixel X1 and the second pixel X2 through the first path L1 and the second path L2, respectively. In this case, the initialization voltage VINT needs to be provided to the first pixel X1 and the second pixel X2, thereby causing charging failure. The charging failure of the initialization voltage VINT may occur at the first node N1 of the first pixel X1, thereby causing the voltage level of the gate-source voltage to be lowered. For this reason, the luminance emitted by the first pixel X1 may decrease. However, according to an embodiment of the present disclosure, even though operations of the first mode MD1 and the second mode MD2 overlap in the overlapping section PD, the 2-2nd scan signal SSb may be controlled to be deactivated during the second portion P2. In the first pixel X1 operating in the first mode MD1, the first node N1 may be easily charged with the initialization voltage VINT during the second portion P2. Accordingly, a display device DD (see FIG. 1) having improved display quality may be provided.

Figure 11:
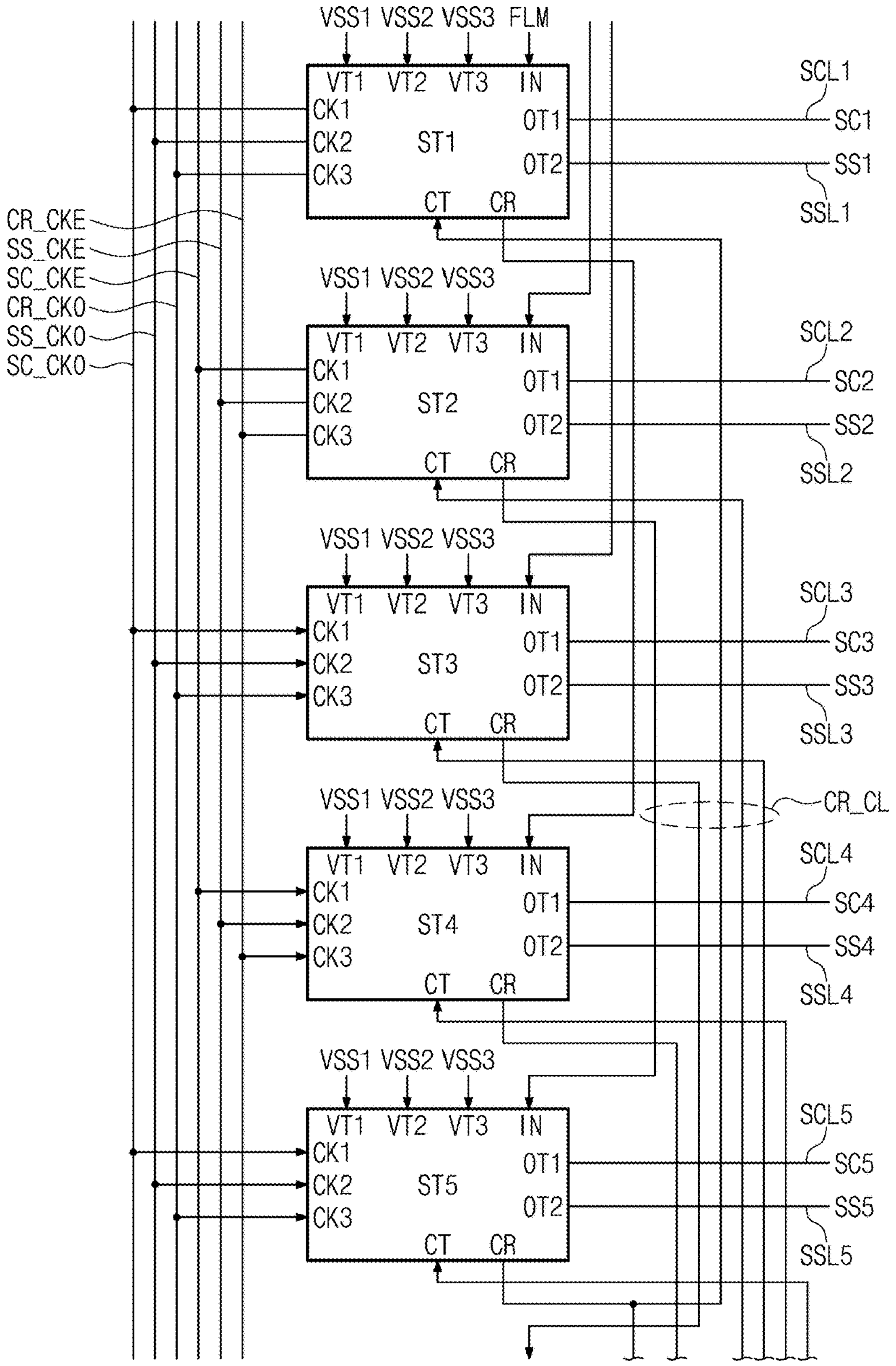
FIG. 11 is a block diagram of a first scan driving circuit shown in FIG. 4, according to an embodiment of the present disclosure.

FIG. 11 is a block diagram of a first scan driving circuit shown in FIG. 4, according to an embodiment of the present disclosure.

Although only five stages ST1 to ST5 are shown in FIG. 11, the remaining stages may also have a configuration similar thereto.

Referring to FIGS. 4 and 11, each of the plurality of stages ST1 to ST5 may include an input terminal IN, a control terminal CT, a carry terminal CR, a first output terminal OT1, and a second output terminal OT2. Moreover, each of the plurality of stages ST1 to ST5 may further include first to third clock terminals CK1 to CK3 and first to third voltage terminals VT1 to VT3.

The input terminal IN may receive a previous carry signal or a start signal FLM output from the carry terminal CR of one of the previous stages. The start signal FLM may be a dummy carry signal output from a dummy stage before the first stage ST1, or a signal provided from the driving controller 100 (see FIG. 3). The control terminal CT may receive the next carry signal output from the carry terminal CR in one of next stages. Wires connecting the carry terminal CR of each stage to the input terminal IN of one of the next stages and the control terminal CT of one of the previous stages may be defined as carry wires CR_CL.

Each of the plurality of stages ST1 to ST5 may receive three clock signals through the first to third clock terminals CK1, CK2, and CK3. Among the plurality of stages ST1 to ST5, the first clock terminal CK1 of the odd stages ST1, ST3, and ST5 may receive a first driving clock signal SC_CKO, the second clock terminal CK2 may receive a first sensing clock signal SS_CKO, and the third clock terminal CK3 may receive a first carrying clock signal CR_CKO. The first clock terminal CK1 of the even-numbered stages ST2 and ST4 may receive a second driving clock signal SC_CKE, the second clock terminal CK2 thereof may receive a second sensing clock signal SS_CKE, and the third clock terminal CK3 thereof may receive a second carry clock signal CR_CKE.

The first and second driving clock signals SC_CKO and SC_CKE have the same period as each other and may have different phases from each other. For example, the first and second driving clock signals SC_CKO and SC_CKE may have inverted phases. The first and second sensing clock signals SS_CKO and SS_CKE have the same period as each other and may have different phases from each other. For example, the first and second sensing clock signals SS_CKO and SS_CKE may have inverted phases. The first and second carry clock signals CR_CKO and CR_CKE have the same period as each other and may have different phases from each other. For example, the first and second carry clock signals CR_CKO and CR_CKE may have inverted phases.

The first voltage terminal VT1, the second voltage terminal VT2, and the third voltage terminal VT3 may receive first to third low voltages VSS1, VSS2, and VSS3, respectively. Each of the first to third low voltages VSS1, VSS2, and VSS3 may have a direct current (DC) voltage level. The first to third low voltages VSS1, VSS2, and VSS3 may have different voltage levels from each other.

The plurality of stages ST1 to ST5 may output the first scan signals SC1 to SC5 and the second scan signals SS1 to SS5 on the first scan lines SCL1 to SCL5 and the second scan lines SSL1 to SSL5. The first and second output terminals OT1 and OT2 of the first stage ST1 may be respectively connected to the first scan line SCL1 and the second scan line SSL1, and may respectively output the first scan signal SC1 and the second scan signal SS1 to the first scan line SCL1 and the second scan line SSL1. The first and second output terminals OT1 and OT2 of the second stage ST2 may be respectively connected to the first scan line SCL2 and the second scan line SSL2, and may respectively output the first scan signal SC2 and the second scan signal SS2 to the first scan line SCL2 and the second scan line SSL2.

Figure 12A:
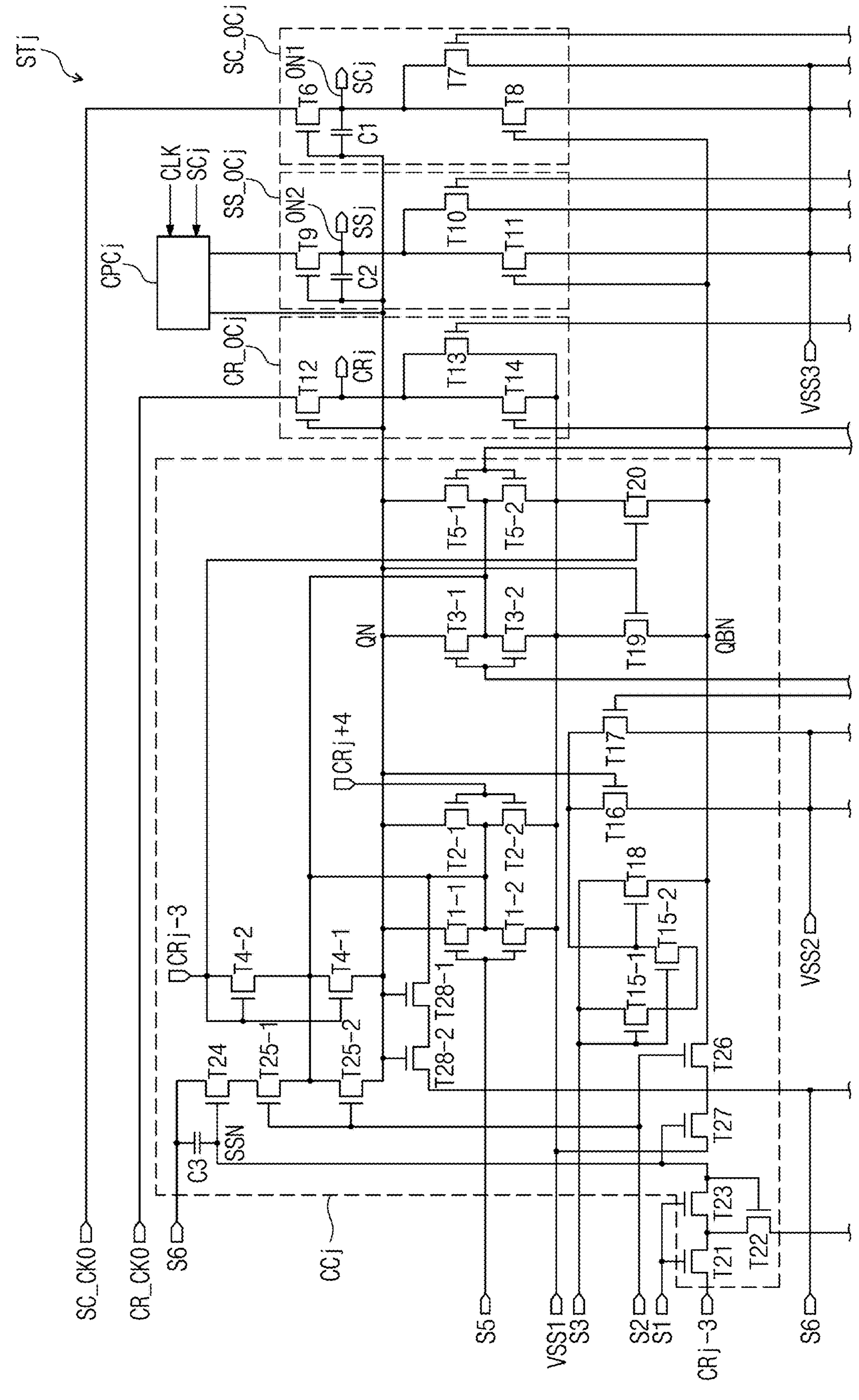
FIG. 12A is a circuit diagram of a j-th stage, according to an embodiment of the present disclosure.

FIG. 12A is a circuit diagram of a j-th stage, according to an embodiment of the present disclosure.

Referring to FIGS. 11 and 12A, a circuit configuration of a j-th stage STj (hereinafter referred to as a "stage") among the plurality of stages ST1 to STn (see FIG. 4) is described. Because each of the plurality of stages ST1 to STn (see FIG. 4) has the same circuit configuration, for convenience of explanation and to avoid redundancy, a description of a circuit configuration of the remaining stages ST1 to STn (see FIG. 4) is omitted. Here, 'j' is a positive integer greater than 1 and smaller than 'n'.

The stage STj may include a first scan output unit SC_OCj (also referred to as a first scan output circuit), a second scan output unit SS_OCj (also referred to as a second scan output circuit), a carry output unit CR_OCj (also referred to as a carry output circuit), a controller CCj (also referred to as a controller circuit), and a compensation unit CPCj (also referred to as a compensation circuit).

The first scan output unit SC_OCj may include first to third buffer transistors T6, T7, and T8, a first capacitor C1, and a first output node ON1. The first scan output unit SC_OCj may be connected to the first output terminal OT1, the first clock terminal CK1, and the third voltage terminal VT3. The first output terminal OT1 may be connected to the first output node ON1. The first scan output unit SC_OCj may output a j-th first scan signal SCj to the first output node ON1 through the first clock terminal CK1 based on a voltage of a first control node QN and the first driving clock signal SC_CKO. The j-th first scan signal SCj may be output to the first output terminal OT1.

The first buffer transistor T6 may output the first driving clock signal SC_CKO as the first scan signal SCj based on the voltage of the first control node QN and the first driving clock signal SC_CKO.

The first capacitor C1 may be connected between the gate and source of the first buffer transistor T6 for a bootstrap operation.

The second buffer transistor T7 may output the third low voltage VSS3 as the first scan signal SCj in response to the voltage of the second control node of the next stage.

The buffer transistor T8 may output the third low voltage VSS3 as the first scan signal SCj in response to the voltage of the second control node QBN.

The second scan output unit SS_OCj may include fourth to sixth buffer transistors T9, T10, and T11, a second capacitor C2, and a second output terminal ON2. The second scan output unit SS_OCj may be connected to the second output terminal OT2, the compensation unit CPCj, and the third voltage terminal VT3. The second output terminal OT2 may be connected to the second output node ON2. The second scan output unit SS_OCj may output a j-th second scan signal SSj to the second output node ON2 through the second clock terminal CK2. The j-th second scan signal SSj may be output to the second output terminal OT2.

The buffer transistor T9 may output the first sensing clock signal SS_CKO as the second scan signal SSj based on the voltage of the first control node QN and the first sensing clock signal SS_CKO.

The second capacitor C2 may be connected between the gate and source of the fourth buffer transistor T9 for a bootstrap operation.

The buffer transistor T10 may output the third low voltage VSS3 as the second scan signal SSj in response to the voltage of the second control node of the next stage.

The buffer transistor T11 may output the third low voltage VSS3 as the second scan signal SSj in response to the voltage of the second control node QBN.

The carry output unit CR_OCj may include seventh to ninth buffer transistors T12, T13, and T14. The carry output unit CR_OCj may be connected to the carry terminal CR and the third clock terminal CK3. Accordingly, the carry output unit CR_OCj may receive the carry clock signal CR_CKO through the voltage of the first control node QN and the third clock terminal CK3 and may output a carry signal CRj to the carry terminal CR.

The buffer transistor T12 may output the carry clock signal CR_CKO as the carry signal CRj based on the voltage of the first control node QN and the carry clock signal CR_CKO.

The buffer transistor T13 may output the first low voltage VSS1 as the carry signal CRj in response to the voltage of the second control node of the next stage.

The buffer transistor T14 may output the first low voltage VSS1 as the carry signal CRj in response to the voltage of the second control node QBN.

The controller CCj may be connected to the input terminal IN, the control terminal CT, and the first and second voltage terminals VSS1 and VSS2. The controller CCj may be further connected to a plurality of signal terminals S1 to S6.

The controller CCj may include a plurality of control transistors T1-1, T1-2, T2-1, T2-2, T3-1, T3-2, T4-1, T4-2, T5-1, T5-2, T15-1, T15-2, T16 to T24, T25-1, T25-2, T26, T27, T28-1, and T28-2, and a third capacitor C3.

Some of the plurality of control transistors T1-1, T1-2, T2-1, T2-2, T3-1, T3-2, T4-1, T4-2, T5-1, T5-2, T15-1, T15-2, T16 to T24, T25-1, T25-2, T26, T27, T28-1, and T28-2 may be implemented with dual transistors.

The controller CCj may include the first control node QN and the second control node QBN. The first control node QN may be electrically connected to the first scan output unit SC_OCj, the second scan output unit SS_OCj, and the carry output unit CR_OCj.

The plurality of control transistors T1-1, T1-2, T2-1, T2-2, T3-1, T3-2, T4-1, T4-2, T5-1, T5-2, T16, T19, T25-1, T25-2, T28-1, and T28-2 may be further connected to the first control node QN. A wire for connecting the plurality of control transistors T1-1, T1-2, T2-1, T2-2, T3-1, T3-2, T4-1, T4-2, T5-1, T5-2, T16, T19, T25-1, T25-2, T28-1, and T28-2 to gates of the first, fourth, and seventh buffer transistors T6, T9, and T12 at the first control node QN may be referred to as a "first control wire."

The second control node QBN may be connected to a gate of the third buffer transistor T8, a gate of the sixth buffer transistor T11, and a gate of the ninth buffer transistor T14. A plurality of control transistors T18, T19, T20, and T26 may be further connected to the second control node QBN. A wire for connecting the plurality of control transistors T18, T19, T20, and T26 to gates of the third, sixth, and ninth buffer transistors T8, T11, and T14 at the second control node QBN may be referred to as a "second control wire."

The fourth control transistors T4-1 and T4-2 may provide the previous carry signal CRj-3 to the first control node QN in response to the previous carry signal CRj-3.

The second control transistors T2-1 and T2-2 may provide the first low voltage VSS1 to the first control node QN in response to the next carry signal CRj+4.

The first control transistors T1-1 and T1-2 may provide the first low voltage VSS1 to the first control node QN in response to a control signal received through the fifth signal terminal S5.

Each of the first, second, and fourth control transistors T1-1, T1-2, T2-1, T2-2, T4-1, and T4-2 may be implemented as a dual transistor including two sub-transistors.

The 28th control transistors T28-1 and T28-2 may provide the high voltage VGH, which is received through the sixth signal terminal S6, to nodes between the sub-transistors of the dual transistor in response to the voltage of the first control node QN. In an embodiment, the 28th control transistors T28-1 and T28-2 may also be implemented as a dual transistor including two sub-transistors.

The third, fifth, and fifteenth to twentieth control transistors T3-1, T3-2, T5-1, T5-2, T15-1, T15-2, T16, T17, T18, T19, and T20 may perform an inverting operation such that the first control node QN and the second control node QBN have voltages opposite to each other. In other words, when the first control node QN has a high voltage, the second control node QBN may have a low voltage. When the first control node QN has a low voltage, the second control node QBN may have a high voltage.

The fifth control transistors T5-1 and T5-2 may provide the first low voltage VSS1 to the first control node QN in response to the voltage of the second control node QBN. The fifth control transistors T5-1 and T5-2 may be implemented as a dual transistor including two sub-transistors.

The nineteenth control transistor T19 may provide the first low voltage VSS1 to the second control node QBN in response to the voltage of the first control node QN.

The third control transistors T3-1 and T3-2 may provide the first low voltage VSS1 to the first control node QN in response to the voltage of the second control node of the next stage. The third control transistor T3-1 and T3-2 may be implemented as a dual transistor including two sub-transistors.

The twentieth control transistor T20 may provide the first low voltage VSS1 to the second control node QBN in response to the previous carry signal CRj-3.

The fifteenth control transistors T15-1 and T15-2 may be turned on in response to the high voltage VGH provided through the third signal terminal S3. The fifteenth control transistor T15-1 and T15-2 may be implemented as a dual transistor including two sub-transistors.

The sixteenth control transistor T16 may be turned on in response to the voltage of the first control node QN.

The seventeenth control transistor T17 may be turned on in response to the voltage of the second control node of the next stage.

While the sixteenth control transistor T16 or the seventeenth control transistor T17 is turned on, the eighteenth control transistor T18 may be turned off based on the second low voltage VSS2 applied to the gate of the eighteenth control transistor T18. While both the sixteenth control transistor T16 and the seventeenth control transistor T17 are turned off, the eighteenth control transistor T18 may provide the high voltage VGH provided through the third signal terminal S3 to the second control node QBN.

The 24th control transistor T24 may be turned on in response to the voltage of a selective sensing input node SSN.

The third capacitor C3 may be connected between the line of the high voltage VGH provided through the sixth signal terminal S6 and the selective sensing input node SSN.

The 25th control transistors T25-1 and T25-2 may be turned on in response to a sensing start signal provided through the second signal terminal S2. The 25th control transistors T25-1 and T25-2 may be implemented as a dual transistor including two sub-transistors.

When the selective sensing input node SSN has a high voltage, and the sensing start signal has a high voltage, the 24th and 25th control transistors T24, T25-1, and T25-2 may provide the high voltage VGH to the first control node QN.

The 26th control transistor T26 may be turned on in response to the voltage of the sensing start signal.

The 27th control transistor T27 may be turned on in response to the voltage of the selective sensing input node SSN.

When the selective sensing input node SSN has a high voltage and the sensing start signal has a high voltage, the 26th and 27th control transistors T26 and T27 may transmit the first low voltage VSS1 to the second control node QBN.

The 21st and 23rd control transistors T21 and T23 may be turned on in response to a control signal provided through the first signal terminal S1. The 21st and 23rd control transistors T21 and T23 may provide the previous carry signal CRj-3 to the selective sensing input node SSN.

The 22nd control transistor T22 may apply the high voltage VGH to a node between the 21st and 23rd control transistors T21 and T23 in response to the selective sensing input node SSN.

FIG. 12A shows that 'j' is odd. Some transistors of the j-th stage STj may be connected to a (j+1)-th stage (e.g., an even-numbered stage).

Each of the plurality of buffer transistors T6 to T14 and the plurality of control transistors T1-1, T1-2, T2-1, T2-2, T3-1, T3-2, T4-1, T4-2, T5-1, T5-2, T13, T14, T15-1, T15-2, T16 to T24, T25-1, T25-2, T26, T27, T28-1, and T28-2 may include an oxide semiconductor. In other words, the plurality of buffer transistors T6 to T14 and the plurality of control transistors T1-1, T1-2, T2-1, T2-2, T3-1, T3-2, T4-1, T4-2, T5-1, T5-2, T13, T14, T15-1, T15-2, T16 to T24, T25-1, T25-2, T26, T27, T28-1, and T28-2 may be transistors having the same type as the transistors PT1 to PT3 of the pixel circuit unit.

The compensation unit CPCj may be connected to the second scan output unit SS_OCj. For example, the compensation unit CPCj may be electrically connected to the fourth buffer transistor T9 and the first control node QN. The compensation unit CPCj may be connected to the second clock terminal CK2. The sensing clock signal SS_CKO may be defined as the clock signal CLK. The clock signal CLK may refer to a square wave indicating that logic state H (high, logic 1) and logic state L (low, logic 0) appear periodically. The signal compensation unit CPCj may receive the clock signal CLK through the second clock terminal CK2. The compensation unit CPCj may receive the first scan signal SCj. The clock signal CLK may include a first clock signal CLK1 (see FIG. 12B) and a second clock signal CLK2 (see FIG. 12B) with different pulse widths from each other.

Figure 12B:
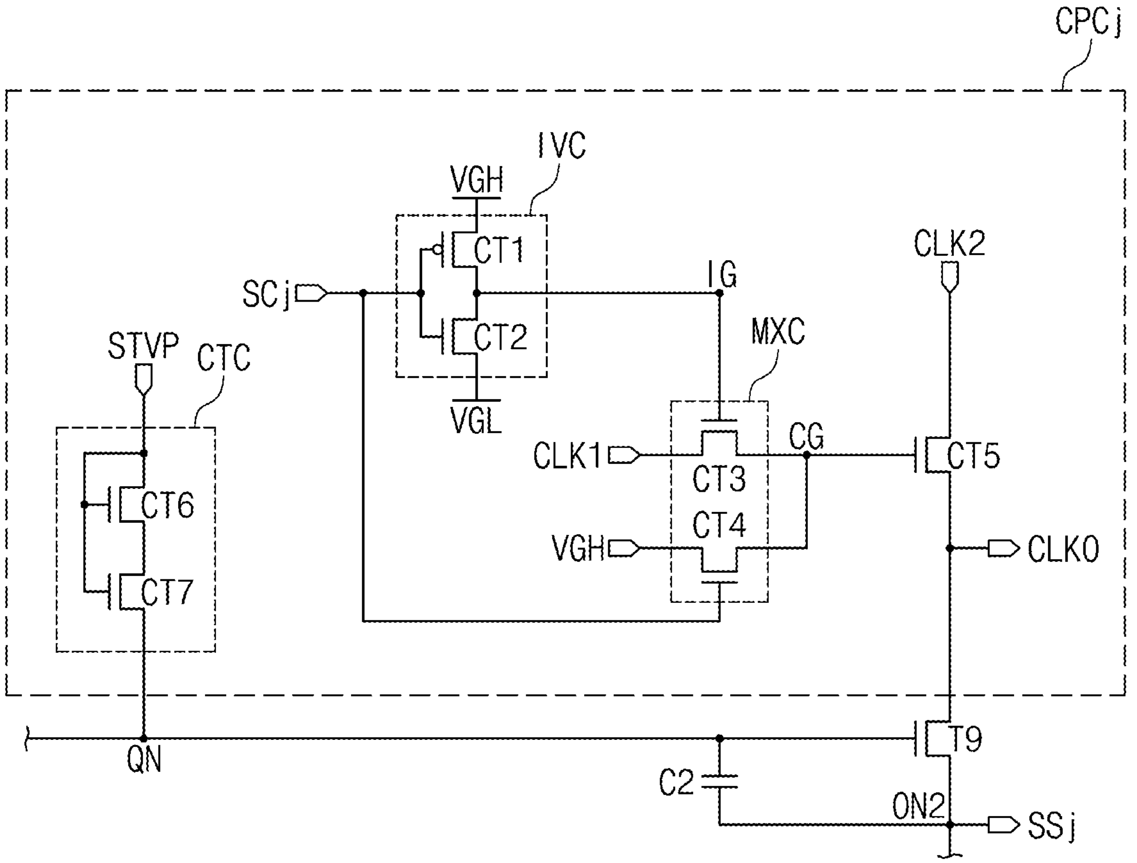
FIG. 12B is a circuit diagram showing a compensation unit, according to an embodiment of the present disclosure.

FIG. 12B is a circuit diagram showing a compensation unit, according to an embodiment of the present disclosure.

Referring to FIGS. 12A and 12B, the compensation unit CPCj may control a pulse width of a second scan signal SSj. The compensation unit CPCj may allow the second scan output unit SS_OCj to output the 2-1st scan signal SSa (see FIG. 8) or the 2-2nd scan signal SSb (see FIG. 8).

The compensation unit CPCj may be implemented by a plurality of compensation transistors CT1, CT2, CT3, CT4, CT5, CT6, and CT7. The compensation unit CPCj may include an inverter circuit IVC, a multiplexer circuit MXC, a fifth compensation transistor CT5, and a control circuit CTC.

The inverter circuit IVC may receive the first scan signal SCj. The inverter circuit IVC may perform an inverting operation such that the input node and a first output node IG have voltages opposite to each other. In other words, when the first scan signal SCj has a high voltage, the first output node IG may have a low voltage. When the first scan signal SCj has a low voltage, the first output node IG may have a high voltage.

The inverter circuit IVC may include the first compensation transistor CT1 and the second compensation transistor CT2. The first compensation transistor CT1 and the second compensation transistor CT2 may be connected to each other. The first compensation transistor CT1 may be a p-type transistor. The second compensation transistor CT2 may be an n-type transistor.

The high voltage VGH may be applied to a first electrode of the first compensation transistor CT1. A second electrode of the first compensation transistor CT1 and a first electrode of the second compensation transistor CT2 may be connected to each other and may be commonly connected to the first output node IG. The low voltage VGL may be applied to a second electrode of the second compensation transistor CT2. The low voltage VGL may have a lower voltage level than the high voltage VGH.

The multiplexer circuit MXC may be electrically connected to the inverter circuit IVC and the buffer transistor CT5. The multiplexer circuit MXC may receive the first scan signal SCj, a first clock signal CLK1, and the high voltage VGH. The multiplexer circuit MXC may selectively output the first clock signal CLK1 or the high voltage VGH to a second output node CG.

The multiplexer circuit MXC may include the third compensation transistor CT3 and the fourth compensation transistor CT4.

A gate of the third compensation transistor CT3 may be electrically connected to the first output node IG. For example, the gate of the third compensation transistor CT3 may receive the first scan signal SCj that is inverted. A first electrode of the third compensation transistor CT3 may receive the first clock signal CLK1. A second electrode of the third compensation transistor CT3 may be electrically connected to the second output node CG.

A gate of the fourth compensation transistor CT4 may be electrically connected to the input node of the inverter circuit IVC. A gate of the fourth compensation transistor CT4 may receive the first scan signal SCj. A first electrode of the fourth compensation transistor CT4 may receive the high voltage VGH. A second electrode of the fourth compensation transistor CT4 may be electrically connected to the second output node CG.

The fifth compensation transistor CT5 may be connected to the multiplexer circuit MXC and the fourth buffer transistor T9. A gate of the fifth compensation transistor CT5 may be connected to the second output node CG. A first electrode of the fifth compensation transistor CT5 may receive a second clock signal CLK2. The second clock signal CLK2 may be one of the first and second sensing clock signals SS_CKO and SS_CKE.

The second electrode of the fifth compensation transistor CT5 may be connected to the fourth buffer transistor T9 and a clock output terminal CLKO. For example, the fifth compensation transistor CT5 and the buffer transistor T9 may be commonly connected to the clock output terminal CLKO.

The control circuit CTC may be electrically connected to the first control node QN. The control circuit CTC may control the voltage level of the first control node QN. The control circuit CTC may include the sixth compensation transistor CT6 and the seventh compensation transistor CT7. The sixth compensation transistor CT6 and the seventh compensation transistor CT7 may be connected in series to each other.

A gate of the sixth compensation transistor CT6 may receive a control signal STVP. A first electrode of the sixth compensation transistor CT6 may be connected to the gate to receive the control signal STVP. A second electrode of the sixth compensation transistor CT6 may be connected to the seventh compensation transistor CT7.

A gate of the seventh compensation transistor CT7 may receive the control signal STVP. The control signal STVP may include a previous carry signal CRj-4. The gate of the seventh compensation transistor CT7 and the gate of the sixth compensation transistor CT6 may be commonly connected to each other. The first electrode of the seventh compensation transistor CT7 may be connected to the second electrode of the sixth compensation transistor CT6. The second electrode of the seventh compensation transistor CT7 may be electrically connected to the first control node QN.

Figure 13:
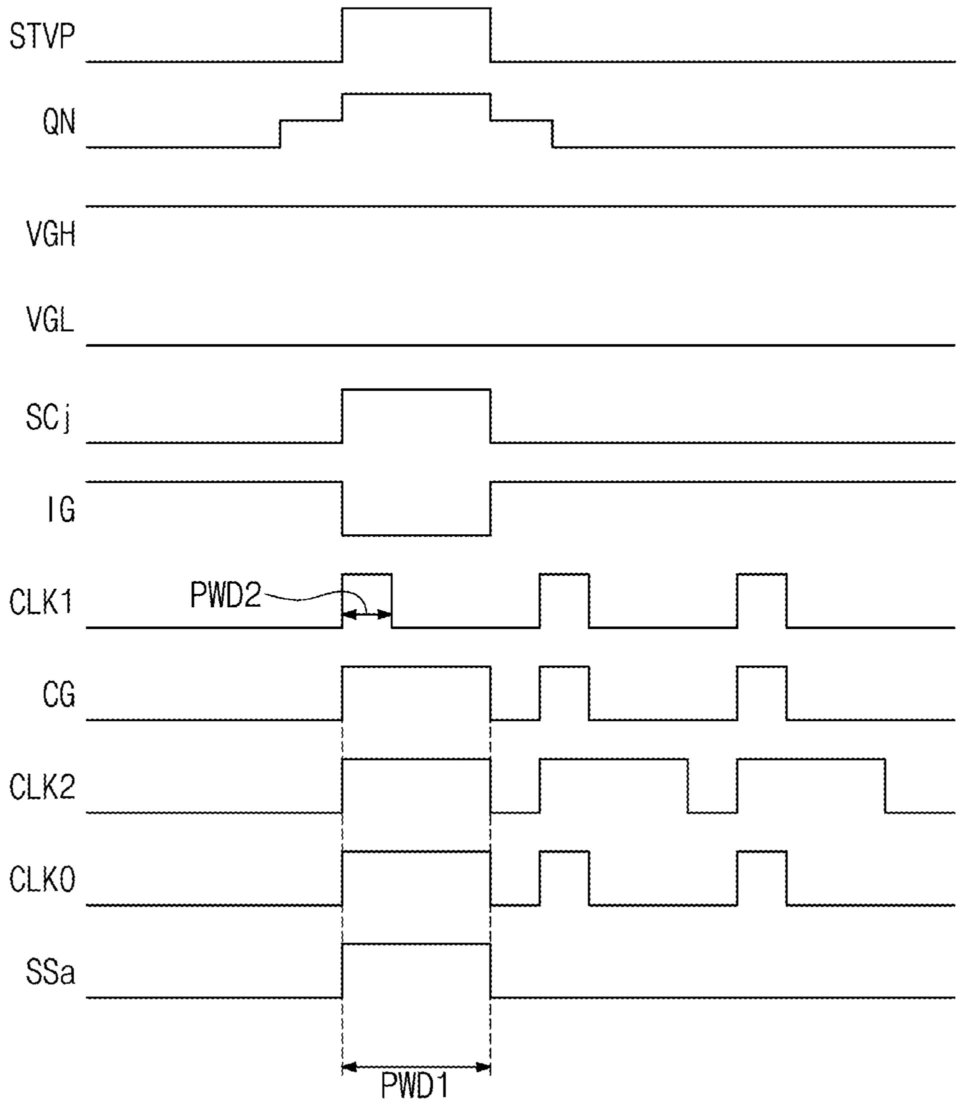
FIG. 13 is a waveform diagram of a signal driven in a first stage, according to an embodiment of the present disclosure.

FIG. 13 is a waveform diagram of a signal driven in a first stage, according to an embodiment of the present disclosure.

Referring to FIGS. 6, 12A, 12B, and 13, during the third section 'C', the first stage STa may output the first scan signal SCj of an activation state and the second scan signal SSj of an activation state. The first stage STa may output the second scan signal SSj based on the first scan signal SCj. At this time, the second scan signal SSj may be the 2-1st scan signal SSa.

As the previous carry signal CRj-3 is activated, the first control node QN may be pre-charged by the fourth control transistors T4-1 and T4-2.

The control signal STVP may be activated. In response to the control signal STVP, the sixth compensation transistor CT6 and the seventh compensation transistor CT7 may be turned on. The control circuit CTC may provide the control signal STVP to the first control node QN. The first control node QN may be bootstrapped by the second capacitor C2, and thus, the voltage level of the first control node QN may increase. The first control node QN may be activated.

As the second clock signal CLK2 becomes a low level, the voltage level of the first control node QN may decrease.

As the next carry signal CRj+4 is activated, the first control node QN may be pulled down. The voltage level of the first control node QN may correspond to the first low voltage VSS1.

The high voltage VGH may have a high voltage of the gate signal.

The low voltage VGL may have a low voltage of the gate signal.

The first scan signal SCj may be activated. The first pixel X1 may be a pixel that operates in the first mode MD1, and thus, may receive the first scan signal SCj that is activated.

The inverter circuit IVC may perform an inverting operation by receiving the first scan signal SCj. The voltage level of the first output node IG may have an inverse signal of the first scan signal SCj. For example, when the voltage level of the first scan signal SCj is an active level, the voltage level of the first output node IG may be an inactive level.

The first clock signal CLK1 may be a signal periodically activated with the second pulse width PWD2. The multiplexer circuit MXC may receive the first clock signal CLK1.

The third compensation transistor CT3 of the multiplexer circuit MXC may be turned off in response to a signal of the first output node IG. The fourth compensation transistor CT4 of the multiplexer circuit MXC may be turned on in response to the first scan signal SCj.

The high voltage VGH with the same pulse width as the first scan signal SCj may be output to the second output node CG.

The second clock signal CLK2 may be a signal periodically activated with the first pulse width PWD1.

The fifth compensation transistor CT5 may be turned on in response to the signal of the second output node CG.

The second clock signal CLK2 may be provided to the output terminal CLKO as much as the pulse width PWD1 of the signal of the second output node CG.

The fourth buffer transistor T9 may output the 2-1st scan signal SSa to the second output node ON2 in response to the signal of the first control node QN activated by the control circuit CTC. When the fourth buffer transistor T9 is activated, at least part of the second clock signal CLK2 may be provided to the second output node ON2 through the fifth compensation transistor CT5. In other words, the first stage STa may output the 2-1st scan signal SSa based on the second clock signal CLK2.

The 2-1st scan signal SSa may have the first pulse width PWD1. When the 2-1st scan signal SSa is output, the first control node QN may be in the active state.

In the first stage STa, the first scan signal SCj may have an active level, the signal output from the inverter circuit IVC may have an inactive level, and the signal output from the multiplexer circuit MXC may have an active level of the first pulse width PWD1. The first stage STa may output the activated 2-1st scan signal SSa having the first pulse width PWD1.

Figure 14:
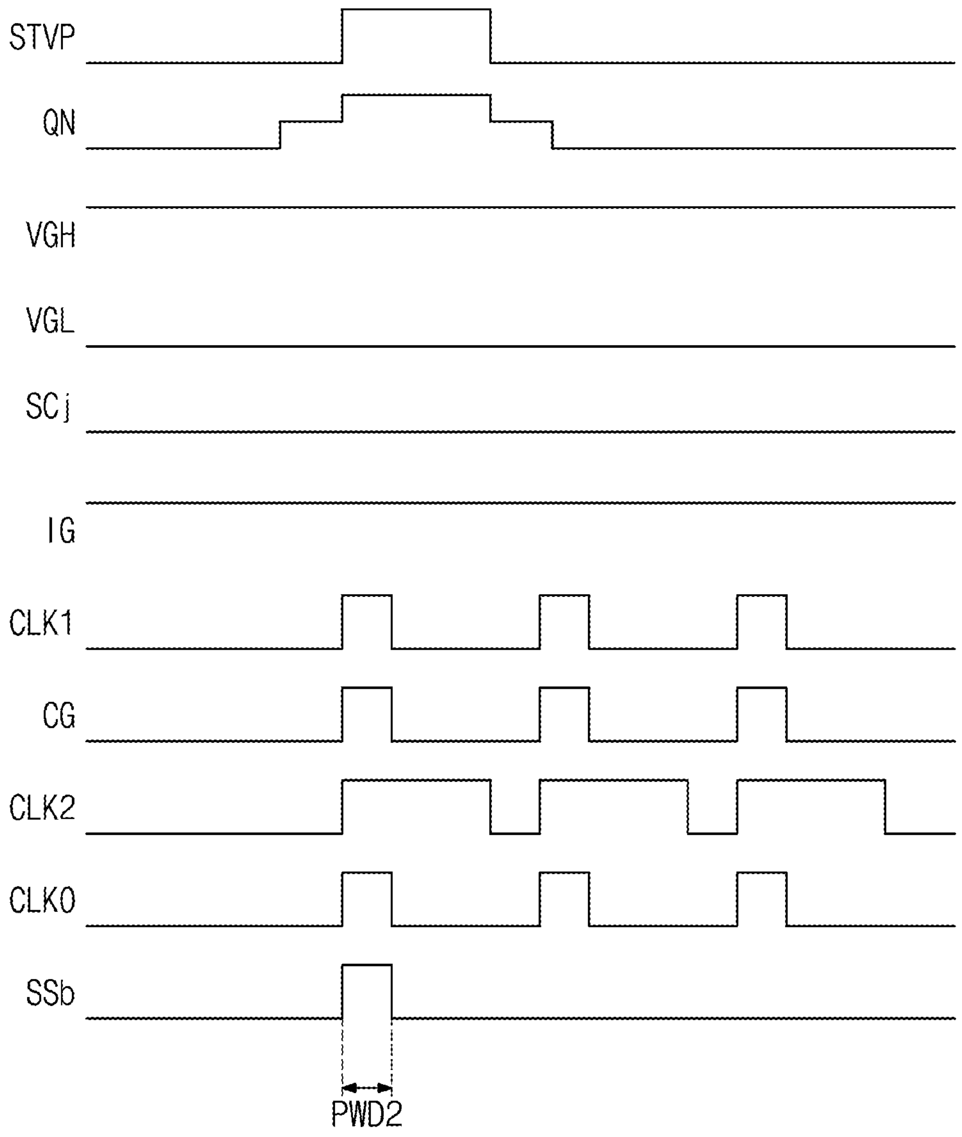
FIG. 14 is a waveform diagram of a signal driven in a second stage, according to an embodiment of the present disclosure.

FIG. 14 is a waveform diagram of a signal driven in a second stage, according to an embodiment of the present disclosure. In the description of FIG. 14, for convenience of explanation and to avoid redundancy, the same reference numerals are assigned to the same components described with reference to FIG. 13.

Referring to FIGS. 6, 12B, and 14, during the third section 'C', the second stage STb may output the first scan signal SCj of a deactivation state and the second scan signal SSj of an activation state. The second stage STb may output the second scan signal SSj based on the second scan signal SCj. At this time, the second scan signal SSj may be the 2-2nd scan signal SSb.

The control signal STVP may be activated. In response to the control signal STVP, the sixth compensation transistor CT6 and the seventh compensation transistor CT7 may be turned on. The control circuit CTC may provide the control signal STVP to the first control node QN. The first control node QN may be activated.

The first scan signal SCj may be deactivated. The second pixel X2 may be a pixel that operates in the second mode MD2, and thus, may receive the first scan signal SCj that is deactivated.

The inverter circuit IVC may receive the first scan signal SCj and may perform an inverting operation on the first output node IG. The first output node IG may be activated.

The third compensation transistor CT3 of the multiplexer circuit MXC may be turned on in response to the signal of the first output node IG. The fourth compensation transistor CT4 of the multiplexer circuit MXC may be turned off in response to the first scan signal SCj.

The first clock signal CLK1 may be output to the second output node CG.

The fifth compensation transistor CT5 may be turned on in response to the signal of the second output node CG.

The second clock signal CLK2 may be provided to the output terminal CLKO as much as the pulse width of the signal of the second output node CG.

The fourth buffer transistor T9 may output the 2-2nd scan signal SSb to the second output node ON2 in response to the signal of the first control node QN activated by the control circuit CTC. When the fourth buffer transistor T9 is activated, at least part of the second clock signal CLK2 may be provided to the second output node ON2 through the fifth compensation transistor CT5. In other words, the second stage STb may output the 2-2nd scan signal SSb based on the second clock signal CLK2.

The 2-2nd scan signal SSb may have the second pulse width PWD2. When the 2-2nd scan signal SSb is output, the first control node QN may be in an active state.

In the second stage STb, the first scan signal SCj may have an inactive level, the signal output from the inverter circuit IVC may have an active level, and the signal output from the multiplexer circuit MXC may have an active level of the second pulse width PWD2. The second stage STb may output the activated 2-2nd scan signal SSb with the second pulse width PWD2.

As described above, when a second scan signal output from each of a first stage and a second stage is activated simultaneously, a pulse width of a 2-1st scan signal output from the first stage may be different from a pulse width of a 2-2nd scan signal output from the second stage. The 2-2nd scan signal may be controlled to be deactivated for a certain period of time. A first pixel driven by the first stage operating in a first mode may be easily charged with an initialization voltage by a certain portion. Accordingly, a display device having improved display quality may be provided.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An electronic A display device, comprising:

a display device comprising a display panel in which an active area and a peripheral area disposed adjacent to the active area are defined, wherein the display panel includes:

a plurality of pixels disposed in the active area and configured to receive a first scan signal and a second scan signal; and a scan driver disposed in the peripheral area and connected to the plurality of pixels, wherein the scan driver includes a plurality of stages arranged sequentially, wherein the plurality of stages includes a first stage and a second stage, and wherein a first pulse width of the second scan signal output from the first stage is different from a second pulse width of the second scan signal output from the second stage, when the second scan signal output from each of the first stage and the second stage is activated simultaneously, wherein the display panel operates during a plurality of frames, wherein each of the plurality of frames operates in a first mode or a second mode different from the first mode, wherein each of the plurality of stages outputs an activated first scan signal and the activated second scan signal, when operating only in the first mode, wherein each of the plurality of stages outputs the activated second scan signal, when operating only in the second mode, and wherein each of the first stage and the second stage outputs the second scan signal activated at a same time, when simultaneously operating in the first mode and the second mode.

2. The electronic device of claim 1, wherein the second pulse width is narrower than the first pulse width when the second stage is disposed after the first stage.

3. The electronic device of claim 1, wherein each of the first stage and the second stage includes:

a first scan output circuit including a first output node configured to output the first scan signal;

a second scan output circuit including a second output node configured to output the second scan signal;

a controller circuit including a plurality of control transistors electrically connected to a control node; and a compensation circuit connected to the second scan output circuit.

4. A display device, comprising:

a display panel in which an active area and a peripheral area disposed adjacent to the active area are defined, wherein the display panel includes:

a plurality of pixels disposed in the active area and configured to receive a first scan signal and a second scan signal; and a scan driver disposed in the peripheral area and connected to the plurality of pixels, wherein the scan driver includes a plurality of stages arranged sequentially, wherein the plurality of stages includes a first stage and a second stage, and wherein a first pulse width of the second scan signal output from the first stage is different from a second pulse width of the second scan signal output from the second stage, when the second scan signal output from each of the first stage and the second stage is activated simultaneously, wherein each of the first stage and the second stage includes:

a first scan output circuit including a first output node configured to output the first scan signal;

a second scan output circuit including a second output node configured to output the second scan signal;

a controller circuit including a plurality of control transistors electrically connected to a control node; and a compensation circuit connected to the second scan output circuit, wherein the compensation circuit includes:

an inverter circuit connected to the first output node; and a multiplexer circuit connected to the first output node and the inverter circuit.

5. The display device of claim 4, wherein the multiplexer circuit receives a first clock signal having the second pulse width.

6. The display device of claim 5, wherein the second stage generates and outputs the second scan signal based on the first clock signal.

7. The display device of claim 4, wherein the compensation circuit further includes a control circuit connected to the control node and configured to control a voltage level of the control node.

8. The display device of claim 7, wherein the control node is in an active state when the second scan signal is output.

9. The display device of claim 4, wherein the first stage generates and outputs the second scan signal based on the first scan signal.

10. The display device of claim 4, wherein, when the second scan signal output simultaneously from each of the first stage and the second stage is activated, in the first stage, the first scan signal has an active level, a signal output from the inverter circuit has an inactive level, and a signal output from the multiplexer circuit has an active level.

11. The display device of claim 4, wherein, when the second scan signal output simultaneously from each of the first stage and the second stage is activated, in the second stage, the first scan signal has an inactive level, a signal output from the inverter circuit has an active level, and a signal output from the multiplexer circuit has an active level of the second pulse width.

12. A display device, comprising:

a display panel in which an active area and a peripheral area disposed adjacent to the active area are defined, wherein the display panel includes:

a plurality of pixels disposed in the active area and configured to receive a first scan signal and a second scan signal; and a scan driver disposed in the peripheral area and connected to the plurality of pixels, wherein the scan driver includes a plurality of stages arranged sequentially, wherein each of the plurality of stages includes:

a first scan output circuit electrically connected to a control node and including a first output node configured to output the first scan signal;

a second scan output circuit electrically connected to the control node and including a second output node configured to output the second scan signal; and a compensation circuit connected to the second scan output circuit, wherein the compensation circuit receives the first scan signal, a first clock signal having a first pulse width, and a second clock signal having a second pulse width different from the first pulse width, wherein the compensation circuit outputs a signal corresponding to the first clock signal or the second clock signal depending on the first scan signal, and wherein the second scan output circuit outputs the second scan signal based on the signal.

13. The display device of claim 12, wherein, when the second scan signal output from each of at least two stages among the plurality of stages is activated simultaneously, a first pulse width of the second scan signal output from one stage among the at least two stages is different from a second pulse width of the second scan signal output from another stage among the at least two stages.

14. The display device of claim 13, wherein, when the another stage is disposed after the one stage, the second pulse width of the second scan signal is narrower than the first pulse width of the second scan signal.

15. The display device of claim 12, wherein the compensation circuit includes:

an inverter circuit connected to the first output node;

a multiplexer circuit connected to the first output node and the inverter circuit; and a control circuit connected to the control node and configured to control a state of the control node.

16. The display device of claim 15, wherein the display panel operates during a plurality of frames, and wherein each of the plurality of frames operates in at least one of a first mode and a second mode different from the first mode.

17. The display device of claim 16, wherein the plurality of stages sequentially output the first scan signal and the second scan signal when operating in the first mode, and wherein the plurality of stages sequentially output the second scan signal when operating in the second mode.

18. The display device of claim 16, wherein the one stage generates and outputs the second scan signal based on the first scan signal when the first mode and the second mode operate simultaneously.

19. The display device of claim 16, wherein the another stage generates and outputs the second scan signal based on the first clock signal when the first mode and the second mode operate simultaneously.

* * * * *